(12) United States Patent
Akiyama

(10) Patent No.: US 6,688,756 B1
(45) Date of Patent: Feb. 10, 2004

(54) LIGHT SOURCE DEVICE, AND ILLUMINATING OPTICAL SYSTEM AND PROJECTOR INCLUDING THE SAME

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 09/671,256

(22) Filed: Sep. 28, 2000

(30) Foreign Application Priority Data

Mar. 31, 2000 (JP) ........................................ 2000-097211

(51) Int. Cl.[7] ................................................ F21V 7/00
(52) U.S. Cl. ........................ 362/268; 362/308; 362/328
(58) Field of Search ................................ 362/307, 308, 362/309, 268, 328

(56) References Cited

U.S. PATENT DOCUMENTS

| | | |
|---|---|---|
| 1,422,307 A | 7/1922 | Salto |
| 3,296,923 A | 1/1967 | Miles |
| 3,702,395 A | 11/1972 | Rosendahl |
| 3,944,337 A | 3/1976 | Ruben |
| 5,098,184 A * | 3/1992 | van den Brandt et al. .. 362/309 |
| 5,155,631 A | 10/1992 | Snyder et al. .............. 359/708 |
| 5,440,456 A * | 8/1995 | Bertling et al. ............. 362/309 |
| 5,541,746 A | 7/1996 | Hamagishi et al. ........... 359/49 |
| 5,662,400 A | 9/1997 | Shikama et al. |
| 5,692,819 A * | 12/1997 | Mitsutake et al. .......... 362/308 |
| 5,918,968 A | 7/1999 | Choi .......................... 362/268 |
| 5,969,875 A | 10/1999 | Sugawara .................... 359/651 |
| 5,991,098 A | 11/1999 | Pareto ........................ 359/719 |

FOREIGN PATENT DOCUMENTS

| | | |
|---|---|---|
| EP | 0 395 156 A | 10/1990 |
| FR | 2 581 211 A | 10/1985 |

OTHER PUBLICATIONS

Schroder G.: "Technische Optik" 1990, Vogel Buchverlag, Wurzburg, pp. 54–55.
Kingslake R.: "Lens Design Fundamentals" 1978, Academic Press, New York, pp. 112–113

* cited by examiner

Primary Examiner—Stephen Husar
(74) Attorney, Agent, or Firm—Oliff & Berridge, PLC

(57) ABSTRACT

A technique is provided for increasing the parallelism of light emitted from a light source device. A light source device includes a light source lamp consisting of a discharge lamp and an elliptical reflector, and an aspherical lens. In the aspherical lens, an incidence surface is a plane surface, and an emission surface is an aspheric concave surface. By forming the shape of the aspheric surface into the shape of a quadric surface of revolution determined on the basis of a predetermined expression, light of high parallelism can be emitted.

35 Claims, 14 Drawing Sheets

[Fig. 3]

LIGHT SOURCE DEVICE, AND ILLUMINATING OPTICAL SYSTEM AND PROJECTOR INCLUDING THE SAME

BACKGROUND OF THE INVENTION

1. Field of Invention

The present invention relates to a light source device, and an illuminating optical system and a projector including the light source device.

2. Description of Related Art

In projectors, light emitted from an illuminating optical system is modulated according to image information with the use of a modulation device such as a liquid crystal light valve, and the modulated light is projected onto a screen, thereby achieving image display.

SUMMARY OF THE INVENTION

In such projectors, in order to obtain a uniform in-plane distribution of illumination light for illuminating the modulation device, integrator illuminating optical systems for dividing light emitted from a light source lamp into a plurality of partial light beams and superimposing the partial light beams near the modulation device are used. Of such integrator illuminating optical systems, an integrator illuminating optical system (uniform illuminating optical system) using a light source lamp provided with an elliptical reflector, and a lens array, in order to collimate light emitted from the elliptical reflector to be input into the lens array, a spherical concave lens is commonly provided between the light source lamp and the lens array. That is, a light source device for emitting parallel light is formed by a combination of the light source lamp and the spherical concave lens.

However, the light beam emitted from such a light source lamp has high parallelism at the center, but has poor parallelism at the periphery thereof. This is caused by spherical aberration generated in the concave lens. In the illuminating optical system, or in a projector using the illuminating optical system, light beams with poor parallelism cannot pass through the lens array smoothly, and are often wasted. For this reason, according to a conventional illuminating optical system, it is difficult to efficiently utilize the light emitted from the light source lamp. This invention is made to solve the above-described problems in the conventional art, and an object is to provide a technique for increasing parallelism of light emitted from a light source device.

In order to solve at least a part of the above-described problems, according to the present invention, there is provided a light source device including:

a discharge lamp;

an elliptical reflector including a reflecting surface for reflecting light emitted from the discharge lamp; and a lens for collimating the light reflected by the reflecting surface, the lens is an aspherical lens having an aspheric surface in the shape of a quadric surface of revolution on one of an incidence surface and an emission surface.

Since the light source device of the present invention includes the aspherical lens having an aspheric surface in the shape of a quadric surface of revolution on one of the incidence surface and the emission surface, it is possible to increase parallelism of light to be emitted.

In the above light source device, the aspheric surface may, for example, have the shape represented by the following expression when taking coordinate values in the rθZ cylindrical coordinate system, in which the origin is the point of intersection of the aspheric surface and a light source optical axis and which is axisymmetric with respect to the optical axis, as r and Z, the paraxial curvature as c, and the conic constant as K:

$$Z - \frac{c \cdot r^2}{1 + \sqrt{1 - (1+K) \cdot c^2 \cdot r^2}} = 0.$$

This can easily determine the shape of the aspheric surface. In addition, if the lens having the aspheric surface determined on the basis of the expression is used, spherical aberration can be greatly reduced. Therefore, the parallelism of light emitted from the light source device can be considerably increased.

In the above light source device, the aspheric surface may, for example, be a concave surface. In this case, since the lens can be disposed between a first focal point and a second focal point of the elliptical reflector, it is possible to reduce the light source device's size.

In this case, the aspherical lens may be bonded to an opening surface of the elliptical reflector. This can further reduce the light source device's size, and it is possible to allow the aspherical lens to function in front of the light source device.

In the above light source device, however, the aspheric surface may be a convex surface.

In the above light source device, the aspheric surface of the lens may, for example, be a concave surface or a convex surface, and the aspheric surface may, for example, have the shape of an ellipsoidal surface of revolution when the emission surface is an aspheric surface.

When the emission surface is an aspheric surface, the diameter of an emitted light beam can be reduced. Therefore, in a case where the light source device is used in an illuminating optical system or a projector, since the sizes of the optical elements disposed toward the downstream from the light source device can be reduced, the illuminating optical system or the projector can be reduced in size. Furthermore, when the emission surface is an aspheric surface, variations in an in-plane illuminance of the emitted light beam can be greatly reduced.

In this case, the ellipsoid of revolution may, for example, have the shape represented by the following expression in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, and the conic constant as K:

$$Z - \frac{c \cdot r^2}{1 + \sqrt{1 - (1+K) \cdot c^2 \cdot r^2}} = 0, \text{ and}$$

wherein the elliptical reflector may, for example, have the shape represented by the following expression in the rθZ cylindrical coordinate system, in which the origin is the point of intersection of the reflecting surface and the light source optical axis, the light source optical axis is the Z-axis, and the axis perpendicularly intersecting the light source optical axis is the r-axis, as $r_R$ and $Z_R$, the paraxial curvature as $c_R$, and the conic constant as $K_R$:

$$Z_R - \frac{c_R \cdot r_R^2}{1 + \sqrt{1 - (1 + K_R) \cdot c_R^2 \cdot r_R^2}} = 0,$$

and $K_R$ is within the range of $-0.8 < K_R < -0.5$.

This can easily determine the shape of the ellipsoid of revolution. In addition, if the lens having the aspheric surface determined on the basis of the expression is used, spherical aberration can be greatly reduced. Therefore, the parallelism of light emitted from the light source device can be considerably increased.

In the above light source device, the aspheric surface of the lens may, for example, be a concave surface or a convex surface, and the incidence surface of the lens may, for example, be a spherical surface when the emission surface is an ellipsoid of revolution.

This can prevent light from being refracted at the incidence surface of the lens and therefore, it is possible to obtain an emitted light of higher parallelism. When the incidence surface is a plane surface, the parallelism of the emitted light is less than a case where the incidence surface is a spherical surface. However, by forming one side of the aspherical lens into a plane surface, the aspherical lens can be produced at relatively low cost.

In addition, the ellipsoid of revolution, in which the aspheric surface of the lens is a concave surface or a convex surface, the emission surface is an ellipsoid of revolution, and the incidence surface is a spherical surface, may, for example, have the shape represented by the following expression in the $r\theta Z$ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, the conic constant as K, and the refraction index of the lens as n:

$$Z - \frac{c \cdot r^2}{1 + \sqrt{1 - (1 + K) \cdot c^2 \cdot r^2}} = 0, \quad K = -\frac{1}{n^2}.$$

This can easily determine the shape of the ellipsoid of revolution.

In this light source device, the incidence surface of the aspherical lens may, for example, be formed with an ultraviolet reflecting film. This can prevent ultraviolet light from being emitted from the light source device. In addition, the ultraviolet light emitted from the discharge lamp is reflected back to the discharge light whereby intensity of visible light emitted from the light source device can be increased.

In the above light source device, the aspheric surface of the lens may, for example, be a concave surface or a convex surface, and the aspheric surface may, for example, have the shape of a hyperboloid of revolution when the incidence surface is an aspheric surface.

When the incidence surface is an aspheric surface, light reflected by the reflecting surface of the elliptical reflector is collimated by the incidence surface of the lens, and can be prevented from being refracted at the emission surface. Therefore, it is possible to obtain an emitted light of greater parallelism.

In this case, the hyperboloid of revolution may preferably have the shape represented by the following expression in the $r\theta Z$ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, the conic constant as K, and the refraction index of the lens as n:

$$Z - \frac{c \cdot r^2}{1 + \sqrt{1 - (1 + K) \cdot c^2 \cdot r^2}} = 0, \quad K = -n^2.$$

This makes it possible to easily determine the shape of the hyperboloid of revolution. In addition, if the lens having the aspheric surface determined on the basis of the expression is used, spherical aberration can be reduced very small. Therefore, the parallelism of light emitted from the light source device can be considerably increased.

In this light source device, the emission surface of the aspherical lens may be a plane surface, and the emission surface of the aspherical lens may be formed with an ultraviolet reflecting film.

This can prevent ultraviolet light from being emitted from the light source device. In addition, the ultraviolet light emitted from the discharge lamp is reflected back to the discharge light whereby intensity of visible light emitted from the light source device can be increased.

It is possible to use the above-described light source device as a light source device in an illuminating optical system including a lens array for dividing light emitted from the light source device into a plurality of partial light beams, and a superimposing lens for superimposing the partial light beams divided by the lens array on an illumination area.

In addition, in the illuminating optical system, when a light source device is used in which an incidence surface of an aspherical lens has the shape of a hyperboloid of revolution and an emission surface is a plane surface, the lens array may be provided on the emission surface of the aspherical lens. This makes it possible to reduce the illuminating optical system in size.

In addition, it is possible to use the above-described light source device as a light source device in a projector including an electro-optical device having a light incidence surface as an illumination area illuminated by the light source device, and modulating the incident light from the light source device according to image information, and a projection optical system for projecting light modulated by the electro-optical device.

By using the above-described light source device as a light source of the illuminating optical system or a projector, it is possible to increase light utilization efficiency and increase the brightness of a projected image.

DETAILED DESCRIPTION OF PREFERRED EMBODIMENTS

A. Light Source Device 150A

Figure 1:
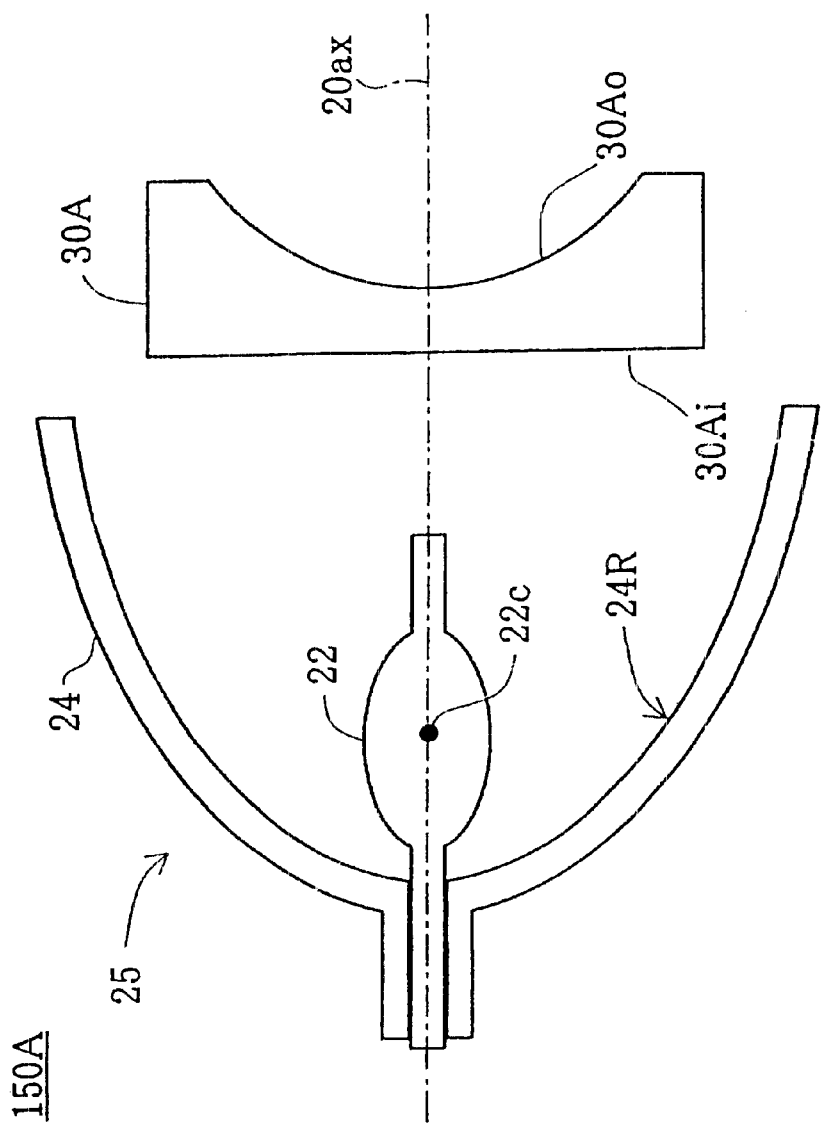
FIG. 1 is an illustration showing a light source device 150A according to a first embodiment of the present invention.

FIG. 1 is an illustration showing a light source device 150A according to a first embodiment of the present invention. The light source device 150A includes a light source lamp 25 consisting of a discharge lamp 22 and a reflector 24, and an aspherical lens 30A. The reflector 24 is an elliptical reflector having a reflecting surface 24R consisting of an ellipsoid of revolution that is axisymmetric with respect to a light source optical axis 20$ax$.

The ellipsoid of revolution is formed of, for example, glass. The reflecting surface 24R is formed with a dielectric multilayer film. The reflecting surface 24R may be formed with a metallic reflecting film, such as an aluminum film or a silver film.

The discharge lamp 22 emits light radially. The center 22$c$ of the discharge lamp 22 is disposed at a position of one focal point (first focal point) of two focal points of the elliptical reflector 24 on the light source optical axis 20$ax$ that is near the elliptical reflector 24. "The center of the discharge lamp" means the center of an arc of the discharge lamp 22. Light radially emitted from the discharge lamp 22 is reflected by the elliptical reflector 24, and the reflected light travels toward the other focal point (second focal point) of the elliptical reflector 24. A metal halide lamp or a high-pressure mercury lamp is used as the discharge lamp 22. The light source axis 20$ax$ is the central axis of the light beam emitted from the light source device 150A.

The aspherical lens 30A has the function of converting the reflected light reflected by the elliptical reflector 24 into nearly parallel light. In the aspherical lens 30A shown in FIG. 1, an incidence surface 30Ai is a plane surface, and an emission surface 30Ao is an aspherical concave surface.

Figure 2:
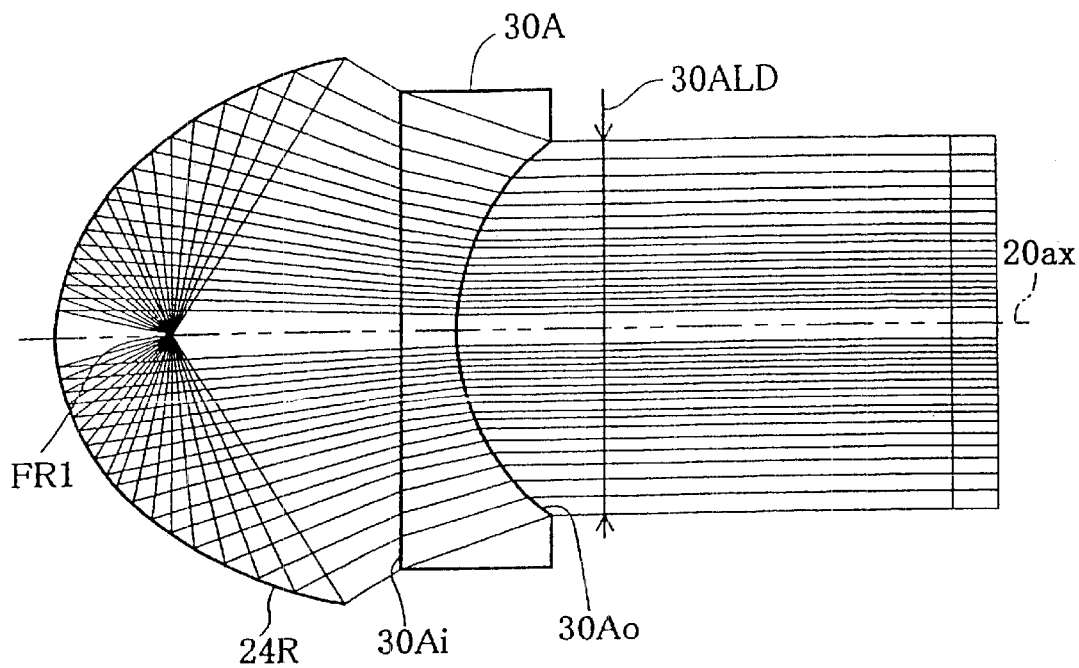
FIG. 2 is an illustration showing the loci of a light beam radially emitted from the center of a discharge lamp 22 in the light source device 150A.
Figure 3:
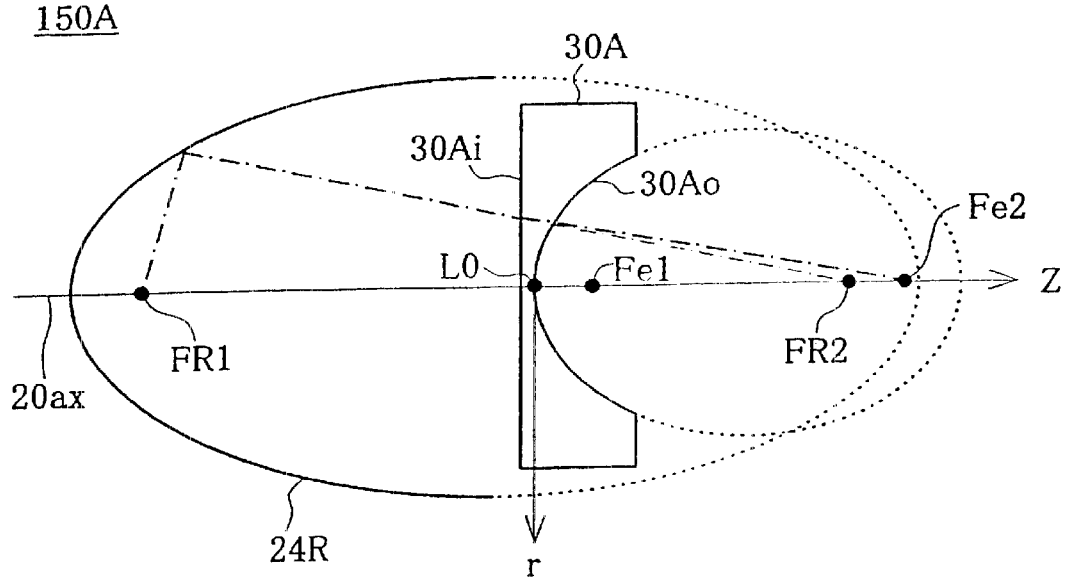
FIG. 3 is an illustration showing the relationship between a reflecting surface 24R of an elliptical reflector and an aspherical lens 30A.

FIG. 2 shows the loci of a light beam radially emitted from the center of the discharge lamp 22 in the light source device 150A according to this embodiment. In FIG. 2, the discharge lamp 22 (FIG. 1) is omitted. FIG. 3 is an illustration showing the relationship between the reflecting surface 24R of the elliptical reflector and the aspherical lens 30A of the light source device 150A shown in FIG. 2. A light beam emitted from a first focal point FR1 of the reflecting surface 24R and reflected by the reflecting surface 24R travels toward a second focal point FR2 of the reflecting surface 24R, and is collimated by the aspherical lens 30A. In FIG. 3, Fe1 and Fe2 indicate a first focal point and a second focal point of an aspheric surface of the aspherical lens 30A, respectively. In the light source device 150A according to this embodiment, by forming the aspheric surface of the emission surface 30Ao of the aspherical lens 30A into the shape that substantially satisfies the relationship of the expression (1), that is, into the shape of a quadric surface of revolution, unlike the conventional light source device, it is possible to emit light of high parallelism.

$$Z - \frac{c \cdot r^2}{1 + \sqrt{1 - (1 + K) \cdot c^2 \cdot r^2}} - \sum_n An \cdot r^n = 0 \qquad (1)$$

wherein r and Z are coordinate values in the r$\theta$Z cylindrical coordinate system in which the origin L0 is the point of intersection of the aspheric surface of the aspherical lens 30A and the light source optical axis 20$ax$ and which is axisymmetric with respect to the light source optical axis 20$ax$. In FIG. 3, in the Z-direction, a direction from the first focal point FR1 toward the second focal point FR2 of the reflecting surface 24R is positive. Also, r shows a distance from the origin L0 in the direction of perpendicularly intersecting the light source optical axis 20$ax$. While $\theta$ represents an angle from the predetermined direction r, the shape of the aspheric surface does not depend on the angle $\theta$, as will be understood from the expression (1).

In the expression (1), the paraxial curvature c represents a curvature of a spherical surface when it is assumed that the light beam reflected by the reflecting surface 24R is converted into parallel light with the use of a spherical concave lens as in the conventional art. That is, in the paraxial area (area near the axis of rotation), by using the concave lens having the curvature c, the light beam reflected by the reflecting surface 24R can be converted into parallel light.

K is a value called a conic constant. The shape of the quadric surface of revolution is limited to a specific shape by the value of the conic constant K. That is, when the value of the conic constant K is greater than −1 and is less than 0, the aspheric surface is an ellipsoidal surface of revolution. When the value of the conic constant K is −1, the aspheric surface is a paraboloid of revolution. Furthermore, when the value of the conic constant K is less than −1, the aspheric surface is a hyperboloid of revolution.

While the third term on the left side is a function called a general aspheric term depending on the distance r, it is disregarded in this embodiment since it is a sufficiently small value.

The shape of the quadric surface of revolution of the aspheric surface of the aspherical lens 30A in this embodiment is determined by the following method based on the following expression (2) in which the third term on the left side in the expression (1) is disregarded.

$$Z - \frac{c \cdot r^2}{1 + \sqrt{1 - (1+K) \cdot c^2 \cdot r^2}} = 0 \quad (2)$$

Firstly, the value of the paraxial curvature c is obtained in consideration of the shape of the reflecting surface 24R of the elliptical reflector, the curvature of the incidence surface 30Ai of the aspherical lens 30A, the refractive index n of the aspherical lens 30A, the thickness of the central part of the aspherical lens 30A, and the installation location of the aspherical lens 30A. Specifically, the shape of the reflecting surface 24R, the curvature of the incidence surface 30Ai of the aspherical lens 30A, the refractive index n of the aspherical lens 30A, the thickness of the central part of the aspherical lens 30A, and the installation location of the aspherical lens 30A are determined in advance. Then, the curvature is obtained such that it is able to convert the light beam into parallel light in a paraxial area (area near the axis of rotation) when a spherical concave lens having the same curvature of the incidence surface, refractive index, and thickness of the central part is used at a predetermined position of the elliptical reflector having a reflecting surface that has the same shape as the predetermined shape of the reflecting surface 24R. The thus-obtained value of the curvature is the paraxial curvature c. Here, when the incidence surface 30Ai of the aspherical lens 30A is a plane surface as in the light source device 150A of this embodiment, the curvature of the incidence surface 30Ai is taken as 0.

Next, the conic constant K is obtained. In the light source device 150A of this embodiment, the conic constant K is set to a condition by which the parallel light is emitted by performing a simulation repeatedly with the use of the expression (2) while varying the value thereof. According to this simulation, a case where a diameter of a light spot at a focal point becomes most small when a light beam emitted from the light source device 150A is condensed by an ideal lens having no aberration. In a practical application, there is no problem in regarding a case where the diameter of the light spot at the focal point falls within about 100 μm as the condition in which nearly parallel light is emitted.

Figure 4:
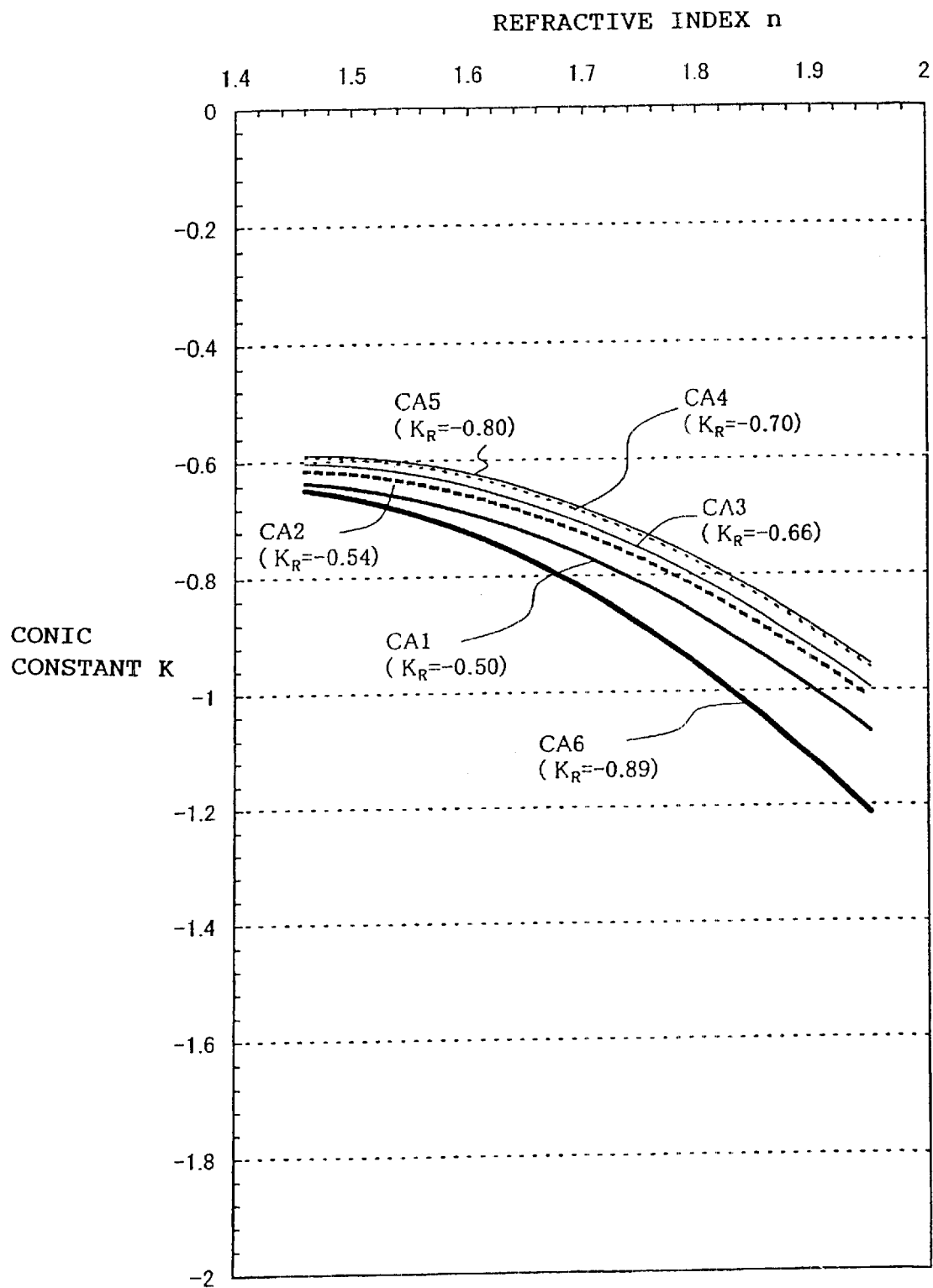
FIG. 4 is a graph showing the relationship between the refractive index n and the conic constant K of the aspherical lens 30A in a light source device 150A.

FIG. 4 is a graph showing the relationship between the conic constant K obtained from the results of the thus-performed simulation and the refractive index n of the aspherical lens 30A. In FIG. 4, there is shown the value of the conic constant K at the refractive index within the range of 1.45 to 1.95 that is common as a lens material for the aspherical lens. The curves CA1 to CA6 show different shapes of the reflecting surface 24R. The shape of the reflecting surface 24R of the elliptical reflector can be represented by the use of the expression (3) similar to the aforementioned expression (2).

$$Z_R - \frac{c_R \cdot r_R^2}{1 + \sqrt{1 - (1+K_R) \cdot c_R^2 \cdot r_R^2}} = 0 \quad (3)$$

wherein $r_R$ and $Z_R$ are coordinate values in the rθZ cylindrical coordinate system in which the origin L0 is the point of intersection of the reflecting surface 24R and the light source optical axis 20ax and which is axisymmetric with respect to the light source optical axis 20ax. In addition, $c_R$ is a paraxial curvature of the elliptical reflector, and $K_R$ is a conic constant. The curves CA1 to CA6 show the value when the conic constant $K_R$ of the reflecting surface 24R is −0.50, −0.54, −0.66, −0.70, −0.80, and −0.89, respectively, in the expression (3).

As will be understood from FIG. 4, in the light source device 150A of this embodiment, when an elliptical reflector having the reflecting surface 24R in which the conic constant $K_R$ falls within the range of −0.8<$K_R$<−0.5 is used, the conic constant $K_R$ may, for example, be set within the range of −0.55<K<−1, that is, into the shape of an ellipsoidal surface of revolution.

In addition, as shown by the curve CA6 in FIG. 4, when the conic constant $K_R$ of the reflecting surface 24R is −0.89 in the expression (3), the conic constant K is less than −1 when the refractive index n of the aspherical lens 30A is greater than or equal to 1.45 and less than 1.84, K=−1 when n=1.84, and K is less than −1 when n is greater than 1.84. That is, in this case, the aspheric surface of the aspherical lens is an ellipsoidal surface of revolution in an area of n<1.84, in the shape of a paraboloid of revolution when n=1.84, and in the shape of a hyperboloid of revolution in an area of n>1.84.

In this case, $K_R$ is closer to 1, that is, the shape of the reflecting surface 24R of the elliptical reflector is almost paraboloid. In this case, the light reflected by the reflecting surface 24R is nearly parallel light without being collimated by a lens. Therefore, there is little need to collimate the light using an aspherical lens. In addition, since the diameter of the aspherical lens becomes relatively large in this case, the diameter of the light beam emitted from the aspherical lens becomes relatively large. From the foregoing, it may not be so practical when $K_R$ is closer to 1. When it is necessary to obtain a light beam of high parallelism, however, even if $K_R$ is closer to 1, the aspherical lens 30A may be used as in this embodiment.

In the light source device 150A according to this embodiment, the second focal point Fe2 of the aspheric surface of the aspherical lens 30A does not coincide with the second focal point FR2 of the reflecting surface 24R of the elliptical reflector. This is because the light traveling toward the second focal point FR2 of the elliptical reflector is refracted at the incidence surface 30Ai of the aspherical lens 30A. When the light traveling toward the second focal point FR2 of the elliptical reflector is refracted only at a portion of an aspheric surface of the aspherical lens as in a light source device 150B, according to another embodiment to be described later, the second focal point Fe2 of the aspheric surface coincides with the second focal point FR2 of the reflecting surface of the elliptical reflector.

As described above, in the light source device according to this embodiment, forming the shape of the aspheric surface of the emission surface 30Ao of the aspherical lens 30A into the shape that satisfies the relationship of the expression (2) in which the third term on the left side of the expression (1) is disregarded, that is, into the shape of the quadric surface of revolution; light of high parallelism can be emitted unlike the conventional light source device. In addition, in the light source device 150A of this embodiment, the conic constant K of the aspheric surface of the aspherical lens 30A may preferably be set to the shape of an ellipsoidal surface of revolution.

B. Light Source Device 150B

Figure 5:
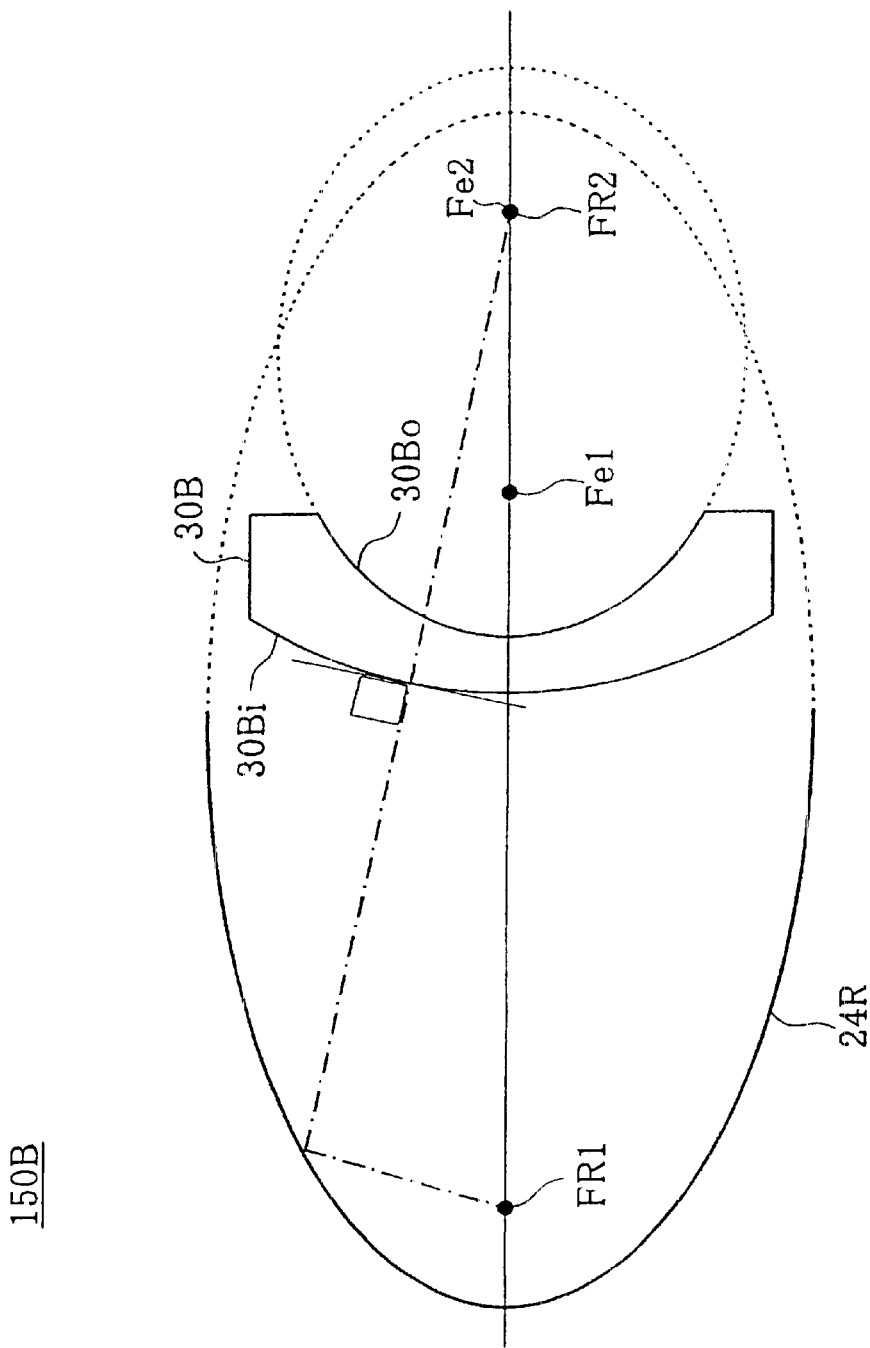
FIG. 5 is an illustration showing the relationship between a reflecting surface 24R of an elliptical reflector and an aspherical lens 30B in a light source device 150B according to a second embodiment of the present invention.

FIG. 5 is an illustration showing a modification of the light source device 150A shown in FIGS. 2 and 3 according to the first embodiment of the present invention. While the incidence surface 30Ai of the aspherical lens 30A is a plane surface in the light source device 150A, an incidence surface 30Bi of an aspherical lens 30B is a spherical surface in this embodiment. Since the components other than the aspherical lens 30B are the same as the light source device 150A according to the first embodiment, they are indicated by the same reference numerals used in FIGS. 1 to 3, and detailed description thereof will be omitted.

In the light source device 150B according to this embodiment, a light beam emitted from a first focal point FR1 of a reflecting surface 24R of an elliptical reflector and reflected by the reflecting surface 24R travels toward a second focal point FR2 of the reflecting surface 24R, and is collimated by the aspherical lens 30B.

In FIG. 5, Fe1 and Fe2, indicate a first focal point and a second focal point of an aspheric surface of the aspherical lens 30B, respectively.

The spherical surface of the incidence surface 30Bi of the aspherical lens 30B is a spherical surface with the center at the second focal point FR2 of the reflecting surface 24R of the elliptical reflector. In addition, the emission surface 30Bo of the aspherical lens 30B is formed in the shape of a quadric surface of revolution that satisfies the relationship of the expression (2), and is able to emit light of high parallelism, as in the case of the light source device 150A according to the first embodiment. If the aspherical lens 30B, having curved surfaces of different shapes, is used for the incidence surface 30Bi and the emission surface 30Bo, respectively, as in this embodiment, the cost of manufacturing the lens is increased. In the light source device 150B of this embodiment, however, since the reflected light from the reflecting surface 24R of the elliptical reflector vertically enters the incidence surface 30Bi of the aspherical lens 30B, the reflected light from the reflecting surface 24R of the elliptical reflector changes its direction of travel one time at the emission surface 30Bo in the aspherical lens 30B. Therefore, the light source device 150B of this embodiment has an advantage of obtaining a light beam of higher parallelism.

The shape of the quadric surface of revolution of the aspheric surface of the aspherical lens 30B in this embodiment is determined by the following method based on the expression (2).

Firstly, the value of the paraxial curvature c is obtained in consideration of the shape of the reflecting surface 24R of the elliptical reflector, the curvature of the incidence surface 30Bi of the aspherical lens 30B, the refractive index n of the aspherical lens 30B, the thickness of the central part of the aspherical lens 30B, and the installation location of the aspherical lens 30B. Specifically, the shape of the reflecting surface 24R, the curvature of the incidence surface 30Bi of the aspherical lens 30B, the refractive index n of the aspherical lens 30B, the thickness of the central part of the aspherical lens 30B, and the installation location of the aspherical lens 30B are determined in advance. Then, the curvature is obtained which can convert the light beam into parallel light in a paraxial area (area near the axis of rotation) when a spherical concave lens having the same curvature of the incidence surface, refractive index, and thickness of the central part is used at a predetermined position of the elliptical reflector having the same shape as the predetermined shape of the reflecting surface 24R. The thus-obtained value of the curvature is the paraxial curvature c.

Next, the conic constant K is obtained. As shown by the curve CB in FIG. 6, in the light source device 150B of this embodiment, unlike the light source device 150A according to the first embodiment, the relationship between the refractive index n and the conic constant K of the aspherical lens 30B does not change even if the shape of the reflecting surface 24R of the elliptical reflector is changed. This is caused by the difference between the shape of the incidence surface 30Ai (plane surface) of the aspherical lens 30A shown in FIG. 3 and the shape of the incidence surface 30Bi (spherical surface) of the aspherical lens 30B shown in FIG. 5. That is, since the incidence surface 30Ai is a plane surface in the aspherical lens 30A shown in FIG. 3, the direction of travel of the reflected light from the reflecting surface 24R is changed by the refraction at the incidence surface 30Ai. On the other hand, since the incidence surface 30Bi is a spherical surface in the aspherical lens 30B shown in FIG. 5, the reflected light from the reflecting surface 24R enters the incidence surface 30Bi in such a manner as to vertically intersect the incidence surface 30Bi, and the direction of travel is not changed. As a result, according to the curve CB, the relationship between the refractive index n of the aspherical lens 30B and the conic constant K is fixed even if the shape of the reflecting surface 24R of the elliptical reflector is changed. The conic constant K of the aspheric surface shaped like a reflecting surface of the aspherical lens 30B shown in FIG. 6 is determined by nearly $K=-1/n^2$.

Therefore, in this embodiment, the conic constant K can be obtained by $K=-1/n^2$, and it is not necessary to perform the simulation as in the first embodiment.

Figure 6:
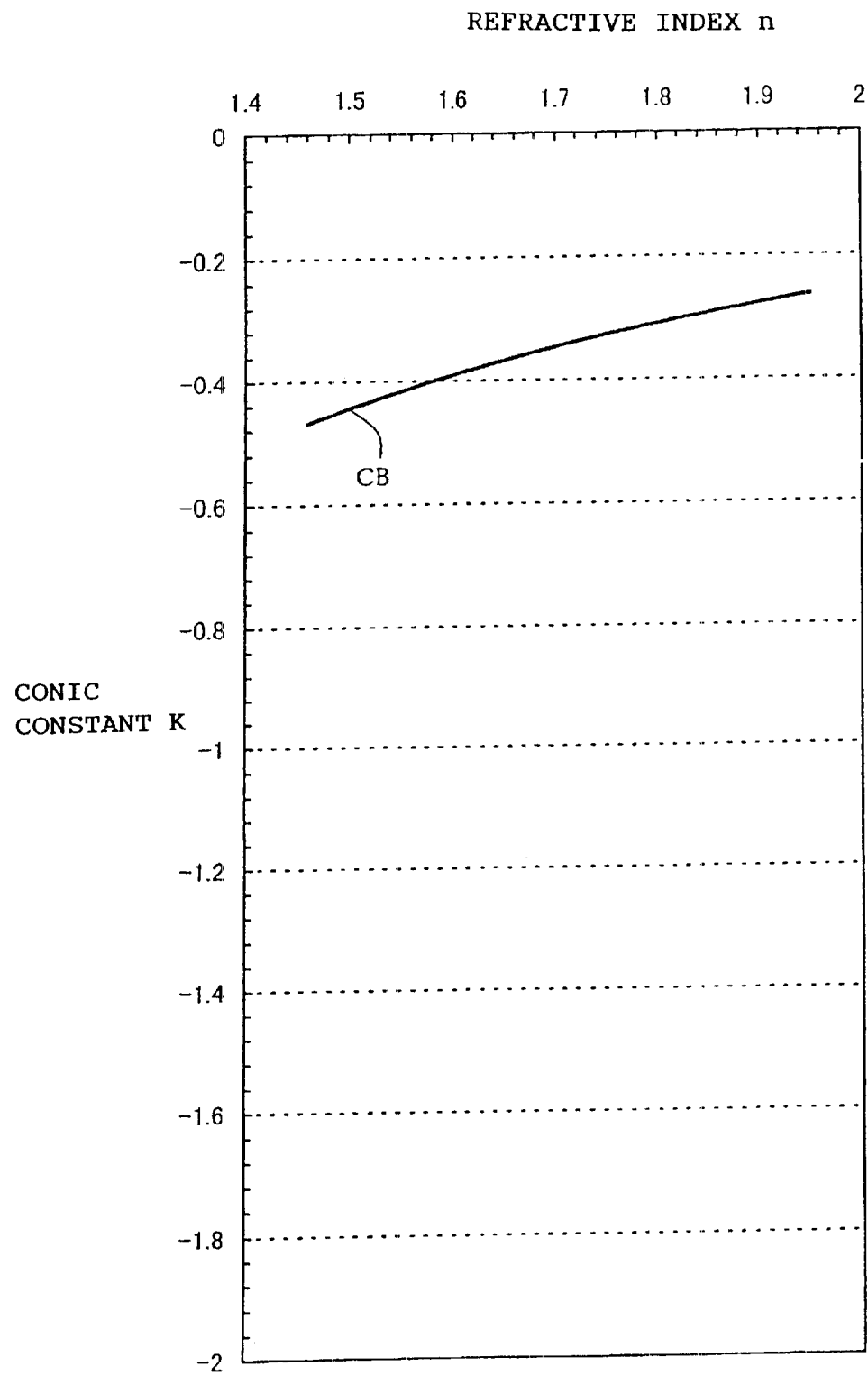
FIG. 6 is a graph showing the relationship between the refractive index n and the conic constant K of the aspherical lens 30B of the light source device 150B.

Furthermore, as will be understood from FIG. 6, in the light source device 150B of this embodiment, the conic constant K of the aspheric surface of the aspherical lens 30B falls within the range of $-0.55<K<-0.3$. Therefore, when the incidence surface 30Bi of the aspherical lens 30B is a spherical surface and the emission surface 30Bo is an aspheric surface as in the light source device 150B of this embodiment, the aspheric surface may, for example, be formed in the shape of an ellipsoid of revolution.

In the light source device 150B according to this embodiment, since the light traveling toward the second focal point FR2 of the elliptical reflector is not refracted at the incidence surface 30Bi of the aspherical lens 30B, the second focal point Fe2 of the aspheric surface of the aspherical lens 30B substantially coincides with the second focal point FR2 of the reflecting surface 24R of the elliptical reflector.

As described above, in the light source device 150B according to this embodiment, forming the shape of the aspheric surface of the emission surface 30Bo of the aspherical lens 30B into the shape that satisfies the relationship of the expression (2) in which the third term on the left side of the expression (1) is disregarded, that is, into the shape of the quadric surface of revolution, light of high parallelism can be emitted unlike the conventional light source device. In addition, in the light source device 150B of this embodiment, since the reflected light from the reflecting surface 24R vertically enters the incidence surface 30Bi of the aspherical lens 30B, it is possible to obtain a light beam of higher parallelism. In addition, in the light source device 1S0B of this embodiment, the conic constant K of the aspheric surface of the aspherical lens 30B may preferably be set to the shape of an ellipsoidal surface of revolution.

C. Light Source Device 150C

Figure 7:
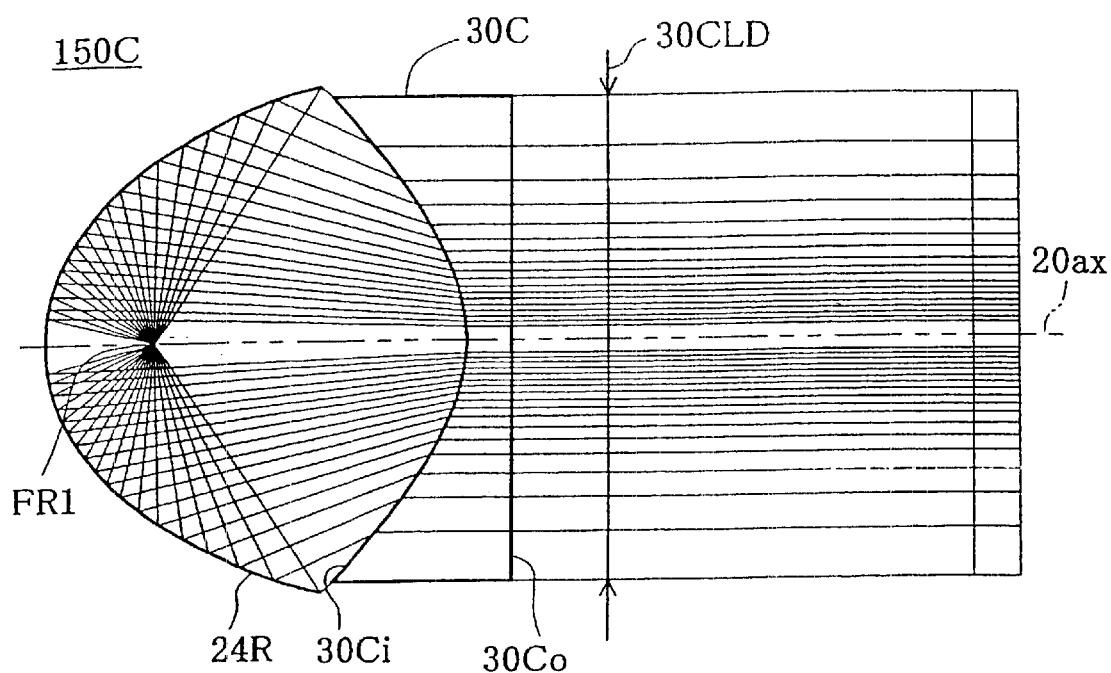
FIG. 7 is an illustration showing the loci of a light beam radially emitted from the center of a discharge lamp 22 in a light source device 150C according to a third embodiment of the present invention.
Figure 8:
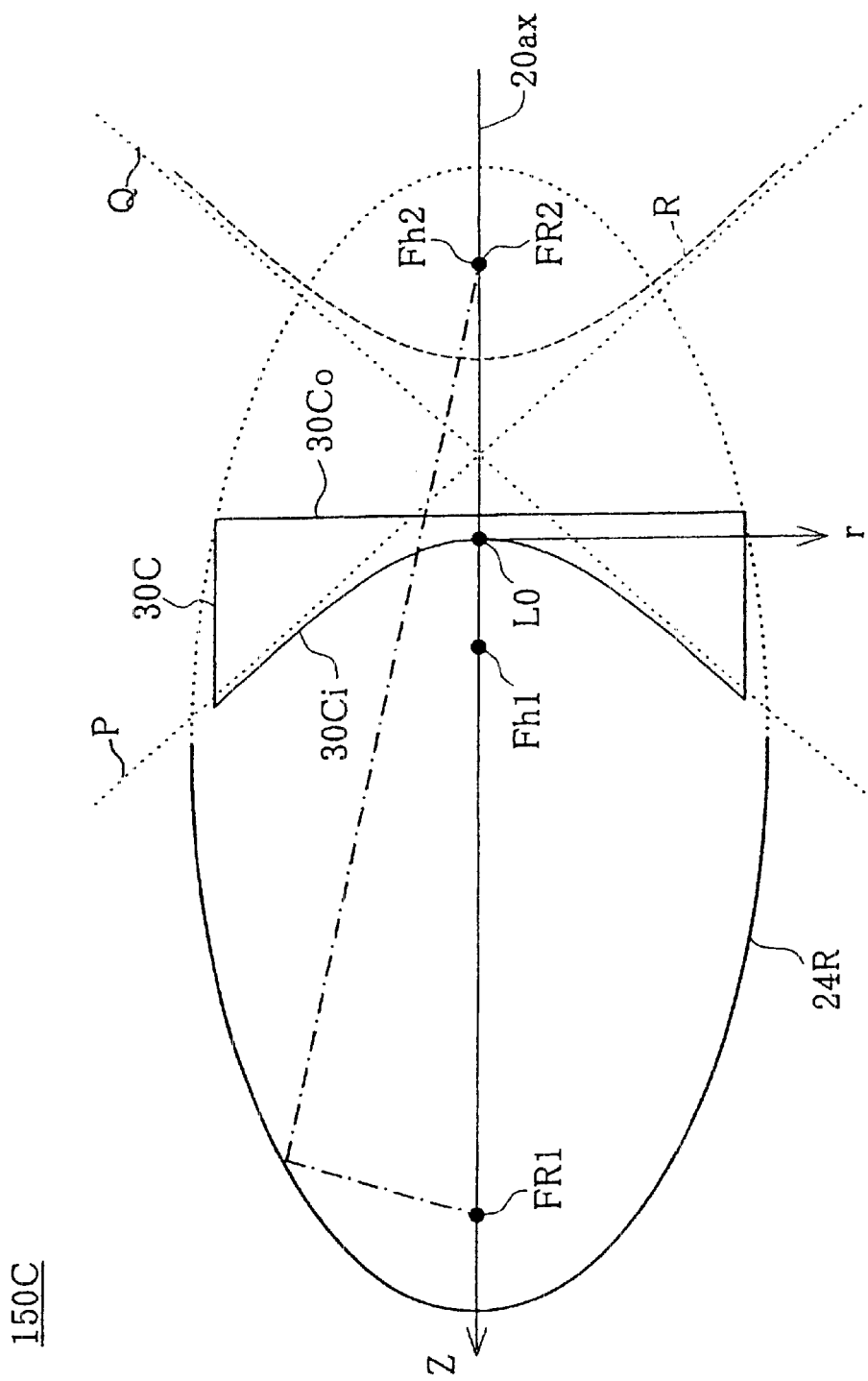
FIG. 8 is an illustration showing the relationship between a reflecting surface 24R of an elliptical reflector and an aspherical lens 30C of the light source device 150C.

FIG. 7 is an illustration showing a light source device 150C according to a third embodiment of the present invention. FIG. 8 is an illustration showing the relationship between a reflecting surface 24R of an elliptical reflector and an aspherical lens 30C of the light source device 150C shown in FIG. 7. While the incidence surface 30Ai is a plane surface and the emission surface 30Ao is an aspheric surface in the light source device 150A according to the first embodiment, an incidence surface 30Ci is an aspheric surface and an emission surface 30Co is a plane surface in this embodiment. Since the components other than the aspherical lens 30C are the same as the light source device 150A according to the first embodiment, they are indicated by the same reference numerals used in FIGS. 1 to 3, and detailed description thereof will be omitted.

In the light source device 150C according to this embodiment, a light beam emitted from a first focal point FR1 of the reflecting surface 24R of the elliptical reflector and reflected by the reflecting surface 24R travels toward a second focal point FR2 of the reflecting surface 24R, and is collimated by the aspherical lens 30C.

In FIG. 8, Fh1 and Fh2 indicate a first focal point and a second focal point of an aspheric surface of the aspherical lens 30C, respectively.

In the light source device 150C of this embodiment, the incidence surface 30Ci of the aspherical lens 30C is formed into the shape of a quadric surface of revolution that satisfies the relationship of the expression (2), and is able to emit light of high parallelism, as in the case of the light source device 150A according to the first embodiment.

As will be understood from the comparison of FIG. 7 and FIG. 2, the light source device 150A according to the first embodiment has an advantage of reducing the diameter of the emitted light beam less than that in the light source device 150C according to this embodiment. That is, the diameter 30ALD of the light beam emitted from the emission surface 30Ao of the aspherical lens 30A is smaller than the diameter of a light beam incident on the incidence surface 30Ai. This is because the light beam of the reflected light at the emission surface 30Ao of the aspherical lens 30A shown in FIG. 2 is condensed to be smaller than the light beam of the reflected light at the incidence surface 30Ci of the aspherical lens 30C shown in FIG. 7 when a space between the elliptical reflector and the aspherical lens 30A is set to be substantially equal to a space between the elliptical reflector and the aspherical lens 30C. Therefore, it is possible to reduce the size of the components accordingly if the light source device 150A according to the first embodiment is used in an illuminating optical system and a projector, to be described later.

In addition, as will be understood from the distribution of loci of the light beams shown in FIG. 7 and FIG. 2, respectively, the light source device 150A according to the first embodiment has an advantage that a light beam having a more uniform in-plane illuminance distribution than that of the light source device 150C of this embodiment is emitted. This is because the emission surface 30Ao is a concave surface in the aspherical lens 30A shown in FIG. 2 and the incidence surface 30Ci is a concave surface in the aspherical lens 30C shown in FIG. 7. That is, in the light source device 150A shown in FIG. 2 according to the first embodiment, there is little difference in an incident angle of light incident on the aspherical lens 30A even at the center and at the periphery of the aspherical lens 30A. On the other hand, in the light source device 150C shown in FIG. 7 according to the third embodiment, there is a considerable difference in an incident angle of light incident on the aspherical lens 30C at the center and at the periphery of the aspherical lens 30C. For this reason, in the light source device 150C, an intensity distribution is easily generated in the emitted light beam.

Furthermore, the light source device 150A according to the first embodiment is more advantageous than the light source device 150C of this embodiment in reducing the cost of manufacturing. In general, considerably high accuracy is required for producing a portion of an aspheric surface of an aspherical lens, and the portion of the aspheric surface can be produced at a relatively low cost since it is small. For this reason, the light source device 150A using the aspherical lens 30A having a small portion of the aspheric surface is more practical since it can be produced at low cost.

The light source device 150C of this embodiment, however, has an advantage of easily obtaining a light beam of higher parallelism as compared to a case where the light source device 150A according to the first embodiment is used. That is, the light beam emitted from the light source device 150A is emitted after changing the direction of travel two times by the refraction at the incidence surface 30Ai and at the emission surface 30Ao of the aspherical lens 30A. On the other hand, the light beam to be emitted from the light source device 150C is emitted after changing the direction of travel only one time by the refraction at the incidence surface 30Ci of the aspherical lens 30C. Therefore, the use of the light source device 150C makes it possible to obtain a light beam of very high parallelism. Thus, when it is necessary to obtain a light beam of higher parallelism, the light source device 150C of this embodiment may be used. While the light source device 150B according to the second embodiment similarly has an advantage of obtaining a light beam of higher parallelism, the light source device 150C of this embodiment is more advantageous since the cost of manufacturing is less because one surface of the aspherical lens 30C of the light source device 150C of this embodiment is a plane surface.

The shape of the quadric surface of revolution of the aspheric surface of the aspherical lens 30C in this embodiment is determined by the following method based on the expression (2).

Firstly, the value of the paraxial curvature c is obtained in consideration of the shape of the reflecting surface 24R of the elliptical reflector, the refractive index n of the aspherical lens 30C, the thickness of the central part of the aspherical lens 30C, and the installation location of the aspherical lens 30C. Specifically, the shape of the reflecting surface 24R, the refractive index n of the aspherical lens 30C, the thickness of the central part of the aspherical lens 30C, and the installation location of the aspherical lens 30C are determined in advance. Then, the curvature is obtained which can convert the light beam into parallel light if there is no spherical aberration when a spherical concave lens having the same refractive index, and thickness of the central part is used at a predetermined position of the elliptical reflector having the same shape as the predetermined shape of the reflecting surface 24R. The thus-obtained value of the curvature is the paraxial curvature c.

Next, the conic constant K is obtained. As shown by the curve CC in FIG. 9, in the light source device 150C of this embodiment, unlike the light source device 150A according to the first embodiment, the relationship between the refractive index n and the conic constant K of the aspherical lens 30C does not change even if the shape of the reflecting surface 24R of the elliptical reflector is changed. This is caused by the difference between the shape of the incidence surface 30Ai (plane surface) of the aspherical lens 30A shown in FIG. 3 and the shape of the incidence surface 30Ci (aspheric surface) of the aspherical lens 30C shown in FIG. 8. That is, since the incidence surface 30Ai is a plane surface in the aspherical lens 30A shown in FIG. 3, the direction of travel of the reflected light from the reflecting surface 24R is changed by the refraction at the incidence surface 30Ai to a non-parallel direction with respect to the optical axis 20ax. On the other hand, in the aspherical lens 30C shown in FIG. 8, since the incidence surface 30Ci is an aspherical surface that is set based on the expression (2), the direction of travel of the reflected light from the reflecting surface 24R is changed to a nearly parallel direction by the refraction at the incidence surface 30Ci, and is little refracted at the emission surface 30Co. As a result, according to the curve CC, the relationship between the refractive index n and the conic constant K of the aspherical lens 30C is fixed even if the shape of the reflecting surface 24R of the elliptical reflector is changed. The conic constant K of the aspheric surface shaped like a reflecting surface of the aspherical lens 30C shown in FIG. 9 is determined by nearly K=−n$^2$.

Therefore, in this embodiment, the conic constant K can be obtained by K=−n$^2$, and it is not necessary to perform the simulation as in the first embodiment.

Figure 9:
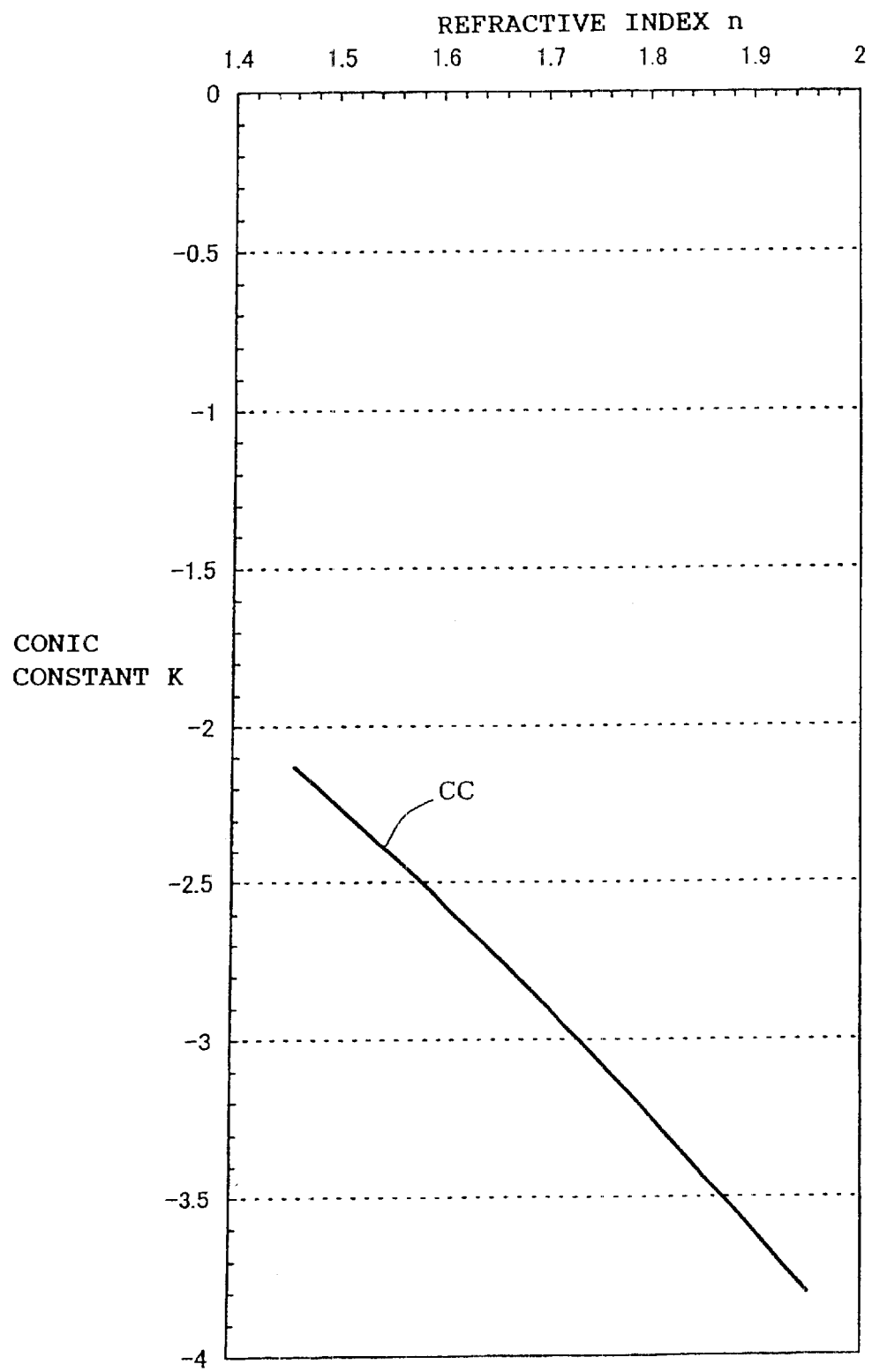
FIG. 9 is an illustration showing the relationship between the refractive index n and the conic constant K of the aspherical lens 30C of the light source device 150C.

Furthermore, as will be understood from FIG. 9, in the light source device 150C of this embodiment, the conic constant K of the aspheric surface of the aspherical lens 30C falls within the range of −2.1<K<−3.8. Therefore, when the incidence surface 30Ci is an aspheric surface as in the light source device 150C of this embodiment, the aspheric surface may, for example, be formed in the shape of a hyperboloid of revolution. The straight line P and the straight line Q in FIG. 8 show asymptotic lines of one hyperbolic line of revolution (a hyperbolic line of revolution constituting a part of the incidence surface 30Ci of the aspherical lens 30C), and the curve R shows the other hyperbolic line of revolution, and they are shown in the figure so that it can be easily understood that the aspheric surface has the shape of a hyperboloid of revolution.

In the light source device 150C according to this embodiment, since the light traveling toward the second focal point FR2 of the elliptical reflector is turned into light parallel to the light source optical axis 20ax by the incidence surface 30Ci of the aspherical lens 30C, and is not refracted at the emission surface 30Co of the aspherical lens 30C, the second focal point Fh2 of the aspheric surface of the aspherical lens 30C substantially coincides with the second focal point FR2 of the reflecting surface 24R of the elliptical reflector.

As described above, in the light source device 150C according to this embodiment, by forming the shape of the aspheric surface of the incidence surface 30Ci of the aspherical lens 30C into the shape that satisfies the relationship of the expression (2) in which the third term on the left side of the expression (1) is disregarded, that is, into the shape of the quadric surface of revolution, light of high parallelism can be emitted unlike the conventional light source device. In addition, in the light source device 150C of this embodiment, since the reflected light from the reflecting surface 24R is turned into light parallel to the light source optical axis 20ax by the incidence surface 30Ci of the aspherical lens 30C, and is not refracted at the emission surface 30Co, it is possible to obtain a light beam of high parallelism. In addition, in the light source device 150C of this embodiment, the conic constant K of the aspheric surface of the aspherical lens 30C may, for example, be set to the shape of a hyperboloid of revolution.

D. Light Source Device 150D

Figure 10:
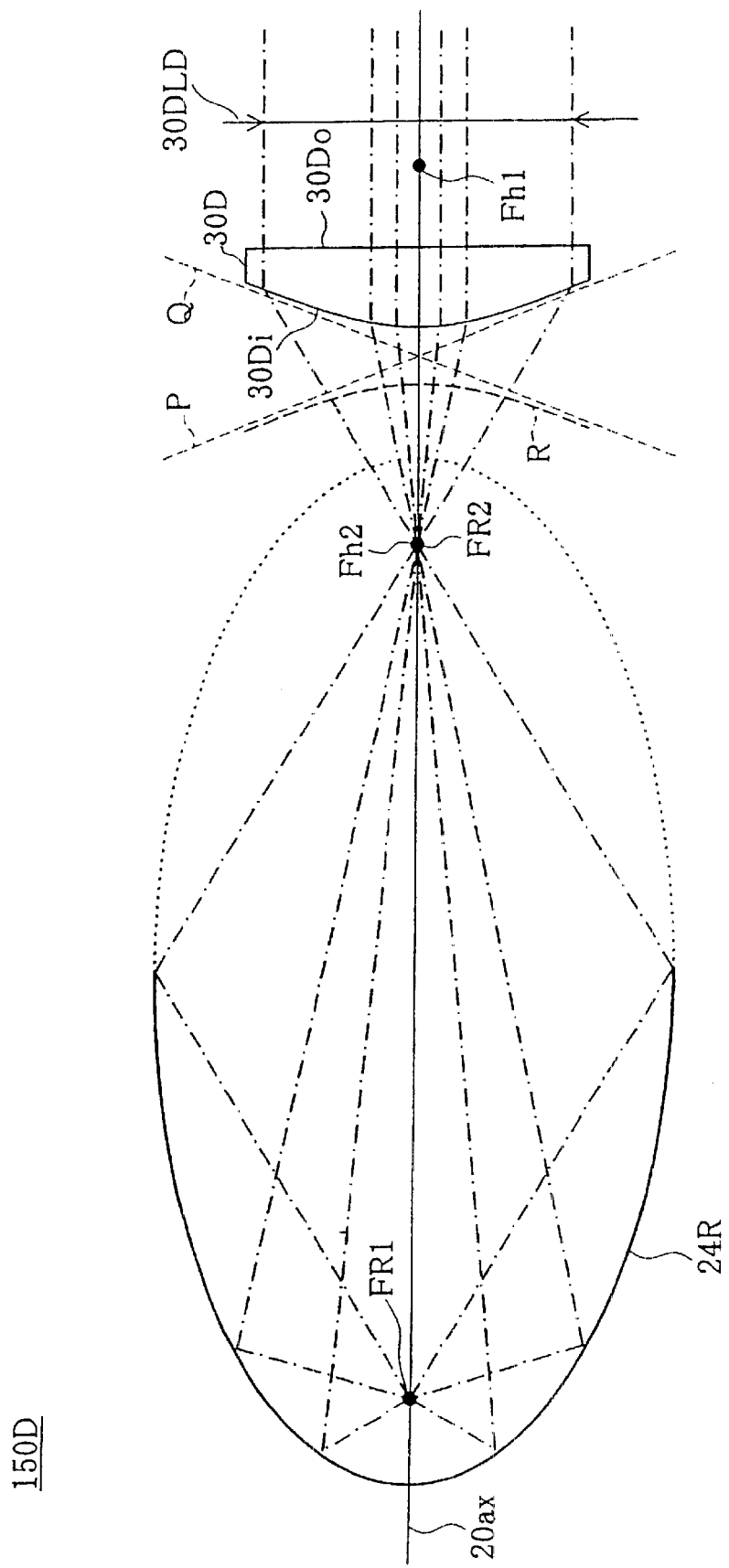
FIG. 10 is an illustration showing the relationship between a reflecting surface 24R of an elliptical reflector and an aspherical lens 30D in a light source device 150D according to a fourth embodiment of the present invention.

FIG. 10 is an illustration showing a modification of the light source device 150C shown in FIGS. 7 and 8 according to the third embodiment of the present invention. In a light source device 150D according to this embodiment, an aspherical lens 30D is installed at a position where reflected light reflected by a reflecting surface 24R of an elliptical reflector is once condensed at a second focal point FR2 and is then diverged. In the light source device 150D of this embodiment, since the components other than the aspherical lens 30D are the same as the light source device 150A according to the first embodiment, they are indicated by the same reference numerals used in FIGS. 1 to 3, and detailed description thereof will be omitted.

In the light source device 150D according to this embodiment, a light beam emitted from a first focal point FR1 of the reflecting surface 24R of the elliptical reflector and reflected by the reflecting surface 24R is condensed at the second focal point FR2 of the reflecting surface 24R, and is then collimated by the aspherical lens 30D. In the aspherical lens 30D, an incidence surface 30Di is an aspheric convex surface, and an emission surface 30Do is a plane surface. In FIG. 10, Fh1 and Fh2 are a first focal point and a second focal point of an aspheric surface of the aspherical lens 30D, respectively.

In the light source device 150D of this embodiment, the incidence surface 30Di of the aspherical lens 30D is formed in the shape of a quadric surface of revolution that satisfies the relationship of the expression (2), and is able to emit light of high parallelism, as in the case of the light source device 150C according to the third embodiment.

As will be understood from the comparison of FIG. 10 and FIG. 8, the light source device 150D according to this embodiment has an advantage of reducing the diameter of the emitted light beam smaller than that in the light source device 150C according to the third embodiment. This is because the aspherical lens 30D can be disposed at a position where the light condensed at the focal point FR2 is not converged larger than an opening area of the reflecting surface 24R. Therefore, it is possible to reduce the size of optical elements disposed subsequent to the light source device if the light source device 150D is used for an illuminating optical system and a projector to be described later. Furthermore, since a portion of an aspheric surface is small, the light source device 150D according to this embodiment is more advantageous than the light source device 150C according to the third embodiment, since the cost of manufacturing is reduced. However, a space between the elliptical reflector and the aspherical lens 30D is larger than that in the light source device 150C according to the third embodiment.

In addition, when compared with the light source device 150A according to the first embodiment, as in the case of the light source device 150C according to the third embodiment, the light source device 150D of this embodiment has a disadvantage that an intensity distribution is easily generated in the emitted light beam, whereas it has an advantage of easily obtaining a light beam of higher parallelism than that of the light source device 150A according to the first embodiment. In addition, when compared with the light source device 150, as in the case of the light source device 150C according to the third embodiment, the light source device 150D is more advantageous, since the cost of manufacturing is reduced.

The shape of a quadric surface of revolution of an aspheric surface of the aspherical lens 30D in this embodiment is determined by a method similar to the method for determining the shape of the aspheric surface of the aspherical lens 30C of the light source device 150C according to the third embodiment based on the expression (2).

In the light source device 150D of this embodiment, as in the case of the light source device 150C, the conic constant K may also preferably be set to the shape of a hyperboloid of revolution. The straight line P and the straight line Q in FIG. 10 show asymptotic lines of one hyperbolic line of revolution (a hyperbolic line of revolution constituting a part of the incidence surface 30Di of the aspherical lens 30D), and the curve R shows the other hyperbolic line of revolution, and they are shown in the figure so that it can be easily understood that the aspheric surface has the shape of a hyperboloid of revolution.

In the light source device 150D according to this embodiment, since the light traveling toward the second focal point FR of the elliptical reflector is not refracted at the aspherical lens 30D, the second focal point Fh2 of the aspheric surface of the aspherical lens 30D substantially coincides with the second focal point FR2 of the reflecting surface 24R of the elliptical reflector.

As described above, in the light source device 150D according to this embodiment, by forming the shape of the aspheric surface of the incidence surface 30Di of the aspherical lens 30D into the shape that satisfies the relationship of the expression (2) in which the third term on the left side of the expression (1) is disregarded, that is, into the shape of the quadric surface of revolution, light of high parallelism can be emitted unlike the conventional light source device. In addition, in the light source device 150D of this embodiment, since the reflected light from the reflecting surface 24R is turned into light parallel to the light source optical axis 20ax by the incidence surface 30Di of the aspherical lens 30D, and is not refracted at the emission surface 30Do, it is possible to obtain a light beam of higher parallelism as in the case of the light source device 150C according to the third embodiment. In addition, in the light source device 150D of this embodiment, the conic constant K of the aspheric surface of the aspherical lens 30D may, for example, be set to the shape of a hyperboloid of revolution.

While the incidence surface 30Di of the aspherical lens is a convex surface, and the emission surface 30Do is a plane surface in this embodiment, an aspherical lens may be used in which an incidence surface of the aspherical lens is a plane surface and an emission surface is a convex surface. In this case, the shape is determined by a method similar to the method for determining the shape of the aspheric surface of the aspherical lens 30A of the light source device 150A according to the first embodiment. In this case, the focal point of the aspheric surface does not coincide with the second focal point FR2 of the reflecting surface 24R of the elliptical reflector, as in the case of the first embodiment. In addition, as in the case of the light source device 150B according to the second embodiment, the incidence surface of the aspherical lens may be a concave surface, and the emission surface may be an aspheric convex surface. This makes it possible to obtain a light beam having higher parallelism, as in the case of the second embodiment. In this case, the shape of the concave surface may be a spherical surface with the center at the second focal point FR2 of the elliptical reflector 24.

E. Illuminating Optical System

Figure 11:
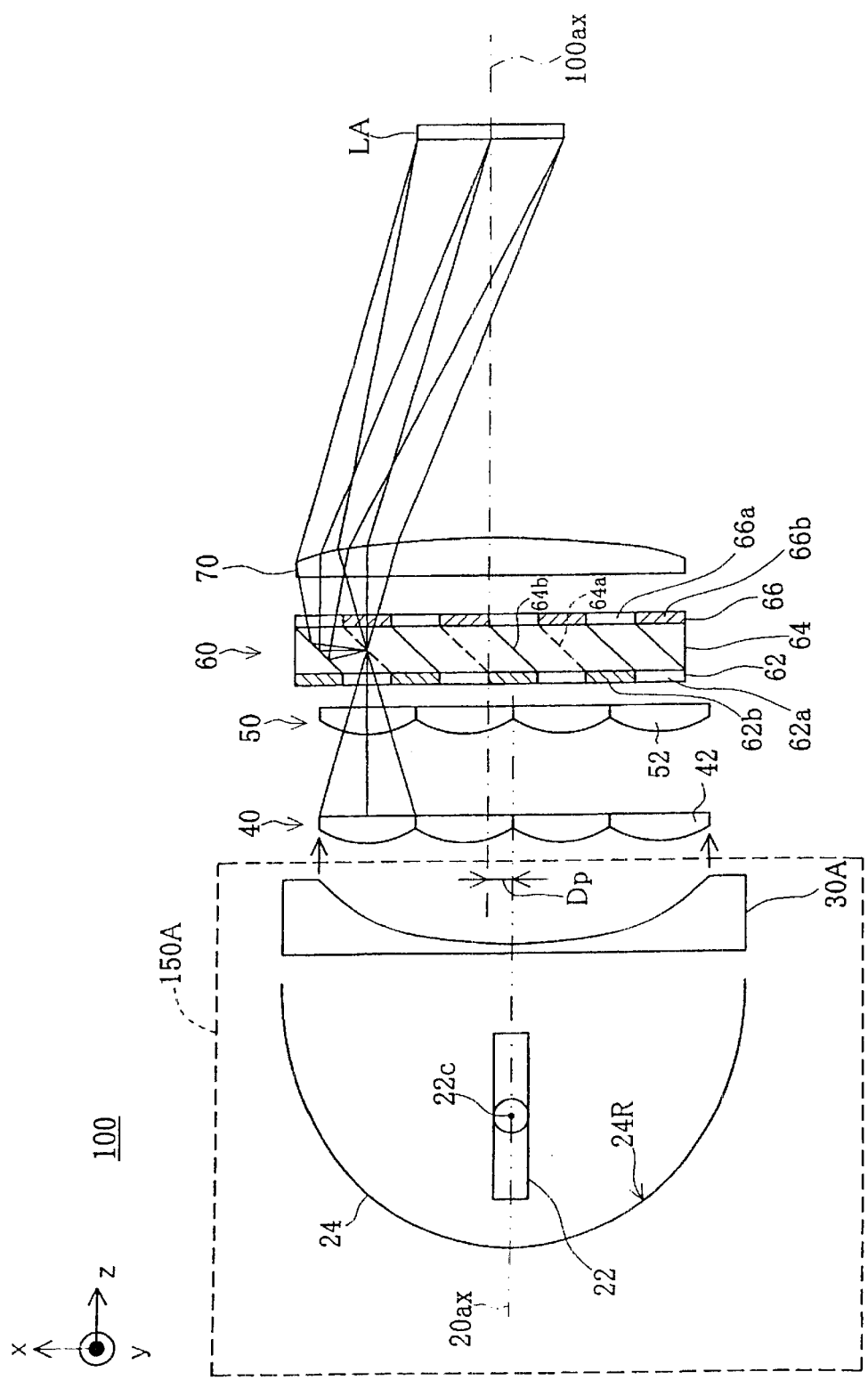
FIG. 11 is a schematic plan view showing the construction of a principal part of an illuminating optical system 100 to which the light source device 150A is applied.

FIG. 11 is a schematic plan view showing the construction of a principal part of an illuminating optical system to which the light source device 150A according to the first embodiment of the present invention is applied. An illuminating optical system 100 shown in FIG. 11 is an illuminating optical system suited to a projector including an illumination area LA such as a liquid crystal panel, which will be described later.

The illuminating optical system 100 includes a light source device 150A, a first lens array 40, a second lens array 50, a polarized-light generating optical system 60, and a superimposing lens 70. Optical elements are disposed in this order along a system optical axis 100ax. Of these optical elements, however, the light source device 150A, the first lens array 40, and the second lens array 50 are disposed with reference to a light source optical axis 20ax. The light source optical axis 20ax deviates from the system optical axis 100ax, which is a central axis of light beams emitted from the polarized-light generating optical system 60 and subsequent optical elements, by a predetermined amount of deviation Dp in the x-direction in the figure. The amount of deviation Dp will be described later.

The first lens array 40 has the function of dividing nearly parallel light emitted from an aspherical lens 30A into a plurality of partial light beams, and of condensing each of the partial light beams near the second lens array 50. In addition, the second lens array 50 has the function of adjusting central axes of the partial light beams emitted from the first lens array 40 so as to be substantially parallel to the system optical axis 100ax.

Figure 12:
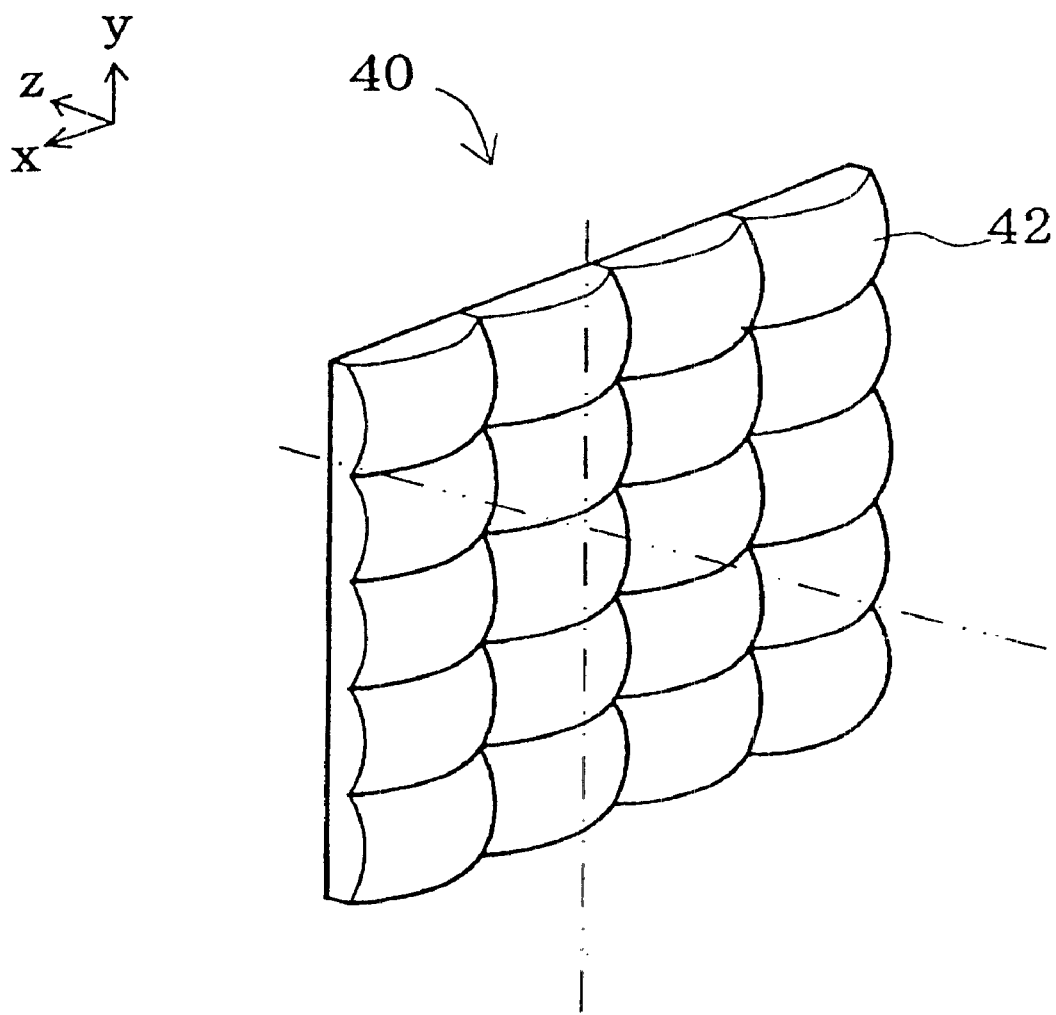
FIG. 12 is a perspective view showing the external appearance of a first lens array 40.

FIG. 12 is a perspective view showing the external appearance of the first lens array 40. The first lens array 40 has a construction such that first small lenses 42 each having a nearly rectangular contour are arranged in a matrix with M rows and N columns. FIG. 12 shows an example in which M=5, and N=4. The external shape of each of the first small lenses 42 as viewed from the z-direction is commonly set to be substantially similar to the shape of the illumination area LA. For example, when a liquid crystal panel is assumed as the illumination area LA, and if the aspect ratio (ratio of longer dimension to the shorter) of an effective area of an image is 4:3, the aspect ratio of each first small lens 42 is set to be 4:3.

The second lens array 50 in FIG. 11 has a construction such that second small lenses 52 are arranged in a matrix with M rows and N columns so as to correspond to the first small lenses 42 of the first lens array 40.

The plurality of (M×N) partial light beams divided by each of the first small lenses 42 of the first lens array 40 are condensed at positions near the second lens array 50, that is, in the polarized-light generating optical system 60, as shown in FIG. 11.

Figure 13A:
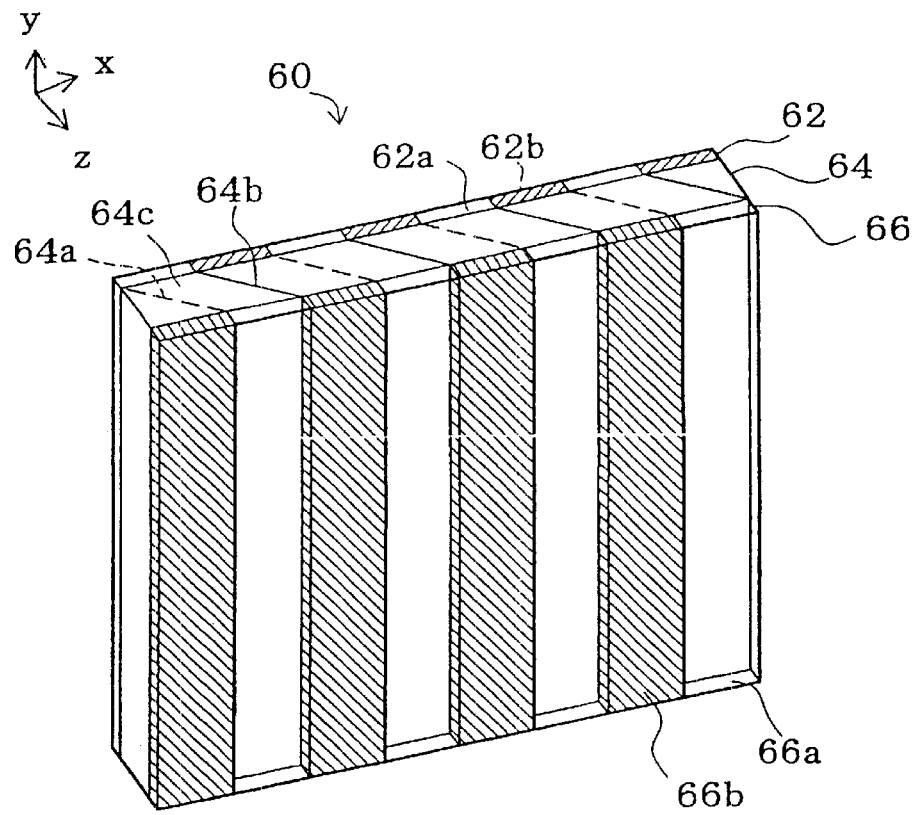
FIG. 13 includes illustrations each showing a polarized-light generating optical system 60.
Figure 13B:
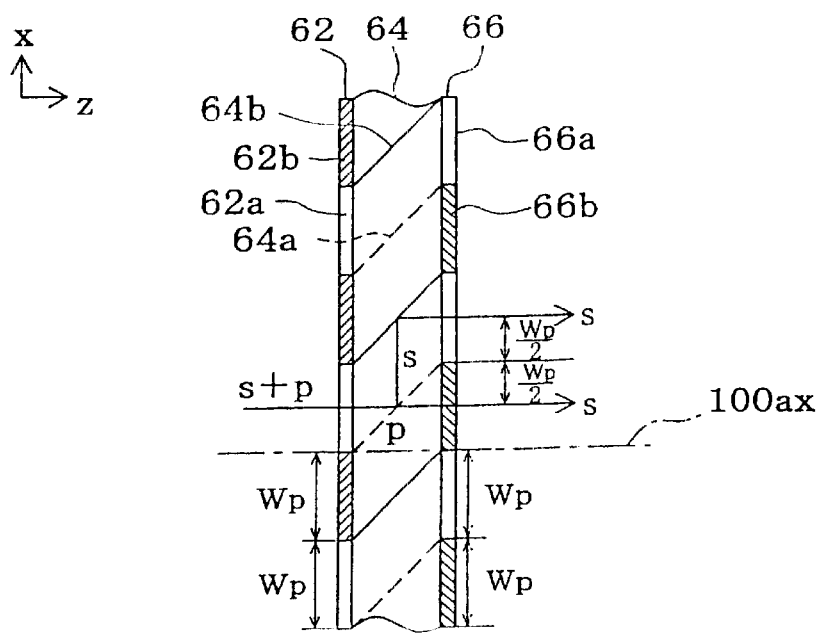

FIG. 13 includes illustrations each showing the polarized-light generating optical system 60. FIG. 13(A) is a perspective view of the polarized-light generating optical system 60, and FIG. 13(B) shows a part of a plan view. The polarized-light generating optical system 60 includes a light-shielding plate 62, a polarization beam splitter array 64, and a selective retardation film 66.

The polarization beam splitter array 64 is, as shown in FIG. 13(A), formed by bonding a plurality of columnar light-transmitting plate members 64c each having the shape of a parallelogram in cross section. Polarization beam separation films 64a and reflecting films 64b are formed alternately on the interfaces of the light-transmitting plate members 64c. Dielectric multilayer films are used as the polarization beam separation films 64a. In addition, dielectric multilayer films or metallic films, such as aluminum films, are used as the reflecting films 64b.

The light-shielding plate 62 is composed of light-shielding surfaces 62b and opening surfaces 62a arranged in the shape of stripes. The light-shielding plate 62 has the function of intercepting a light beam incident on the light-shielding surfaces 62b, and of passing therethrough a light beam incident on the opening surfaces 62a. The light-shielding surfaces 62b and the opening surfaces 62a are arranged so that the partial light beams emitted from the second lens array 50 (FIG. 11) enter only the polarization beam separation films 64a of the polarization beam splitter array 64 and do not enter the reflecting films 64b. Specifically, as shown in FIG. 13(B), the light-shielding surfaces 62b and the opening surfaces 62a are disposed so that the center of each opening surface 62a of the light-shielding plate 62 substantially coincides with the center of each polarization beam separation film 64a of the polarization beam splitter array 64. In addition, the width of each opening surface 62a in the x-direction is set to be substantially equal to the size Wp of the polarization beam separation film 64a in the x-direction. In this case, almost all of the light beams passing through the opening surfaces 62*a* of the light-shielding plate 62 enter only the polarization beam separation films 64*a* and do not enter the reflecting films 64*b*. A plate-like transparent member (such as a glass plate) having a light-shielding film (such as a chromium film, an aluminum film, or a dielectric multilayer film) partially formed thereon can be used as the light-shielding plate 62. In addition a light-shielding plate, such as an aluminum plate, provided with an opening may be used.

Each of the partial light beams emitted from the second lens array 50 (FIG. 11) enters the opening surfaces 62*a* of the light-shielding plate 62 with the main light beam (central axis) thereof substantially in parallel to the system optical system 100ax, as shown by the solid line in FIG. 13(B). The partial light beam passing through the opening surfaces 62*a* enters the polarization beam separation film 64*a*. The polarization beam separation film 64*a* separates the incident partial light beam into a partial light beam of s-polarized light and a partial light beam of p-polarized light. In this case, the partial light beam of p-polarized light is transmitted by the polarization beam separation film 64*a*, and the partial light beam of s-polarized light is reflected by the polarization beam separation film 64*a*. The partial light beam of s-polarized light reflected by the polarization beam separation film 64*a* travels toward the reflecting film 64*b*, where it is further reflected. In this case, the partial light beam of p-polarized light transmitted by the polarization beam separation film 64*a* and the partial light beam of s-polarized light reflected by the reflecting film 64*b* are substantially in parallel to each other.

The selective retardation film 66 is composed of opening layers 66*a* and $\lambda/2$ retardation layers 66*b*. The opening layers 66*a* are portions where the $\lambda/2$ retardation layers 66*b* are not formed. Each opening layer 66*a* has the function of transmitting an incident linear polarized light beam unchanged. On the other hand, each $\lambda/2$ retardation layer 66*b* functions as a polarization conversion element for converting the incident linear polarized light beam into a linear polarized light beam polarized in a direction perpendicular thereto. In this embodiment, as shown in FIG. 13(B), the partial light beam of p-polarized light transmitted by the polarization beam separation film 64*a* enters the $\lambda/2$ retardation layer 66*b*. Therefore, the partial light beam of p-polarized light is emitted while being converted into a partial light beam of s-polarized light by the $\lambda/2$ retardation layer 66*b*. On the other hand, since the partial light beam of s-polarized light reflected by the reflecting film 64*b* enters the opening layer 66*a*, it is emitted unchanged as the partial light beam of s-polarized light. That is, almost all of unpolarized partial light beams incident on the polarized-light generating optical system 60 are emitted while being converted into partial light beams of s-polarized light. Incidentally, by disposing the $\lambda/2$ retardation layer 66*b* only on the emission surface of the partial light beam of s-polarized light reflected by the reflecting film 64*b*, almost all of the partial light beams incident on the polarized-light generating optical system 60 can be emitted while being converted into partial light beams of p-polarized light. In addition, the selective retardation film 66*a* may be one in which no member is provided on the portions of the opening layers 66*a*, and the $\lambda/2$ retardation layers 66*b* are merely bonded on the emission surfaces of the partial light beams of p-polarized light or the partial light beams of s-polarized light.

As will be understood from FIG. 13(B), the centers of two s-polarized light beams emitted from the polarized-light generating optical system 60 deviate from the center of incident unpolarized light (s-polarized light beam+p-polarized light beam) in the x-direction. The amount of deviation is equal to half of the width Wp (that is, the size of the polarization beam separation film 64*a* in the x-direction) of the $\lambda/2$ retardation layer 66*b*. For this reason, as shown in FIG. 11, the light source optical axis 20ax and the system optical axis 100ax are set at positions deviated from each other by a distance Dp that is equal to Wp/2.

As described above, the plurality of partial light beams emitted from the second lens array 50 are separated into two partial light beams by the polarized-light generating optical system 60 for each of the partial light beams, and are converted into substantially one type of linear polarized light beams that are polarized in the same direction.

The plurality of partial light beams polarized in substantially the same direction are superimposed on the illumination area LA by the superimposing lens 70 shown in FIG. 11. As will be understood from the above description, the first lens array 40, the second lens array 50, and the superimposing lens 70 constitute a so-called integrator optical system. This makes it possible to obtain a substantially uniform intensity distribution of light applied to the illumination area LA.

As will be described hereinbelow, the light source device 150A of this embodiment can emit nearly parallel light. Therefore, in the illuminating optical system 100 in FIG. 11, the second lens array 50 or the light-shielding plate 62 having the function of correcting or removing light of poor parallelism may be omitted.

As described previously, the light source device 150A can emit light of high parallelism. Therefore, in the illuminating optical system 100 of this embodiment, it is possible to increase light utilization efficiency. Even if the light source devices 150B to 150D are used instead of the light source device 150A, similar advantages can be obtained.

While the illuminating optical system 100 of this embodiment includes the uniform illuminating optical system formed by the lens arrays 40, 50 and the superimposing lens, and the polarized-light generating optical system 60, the light source devices 150A to 150D may be used separately without combinations with the uniform illuminating optical system or the polarized-light generating optical system. In addition, the light source devices 150A to 150D can constitute the illuminating optical system by a combination only with the uniform illuminating optical system. That is, the light source devices 150A to 150D can be applied to an illuminating optical system that is not provided with the polarized-light generating optical system 60.

F. Projector

Figure 14:
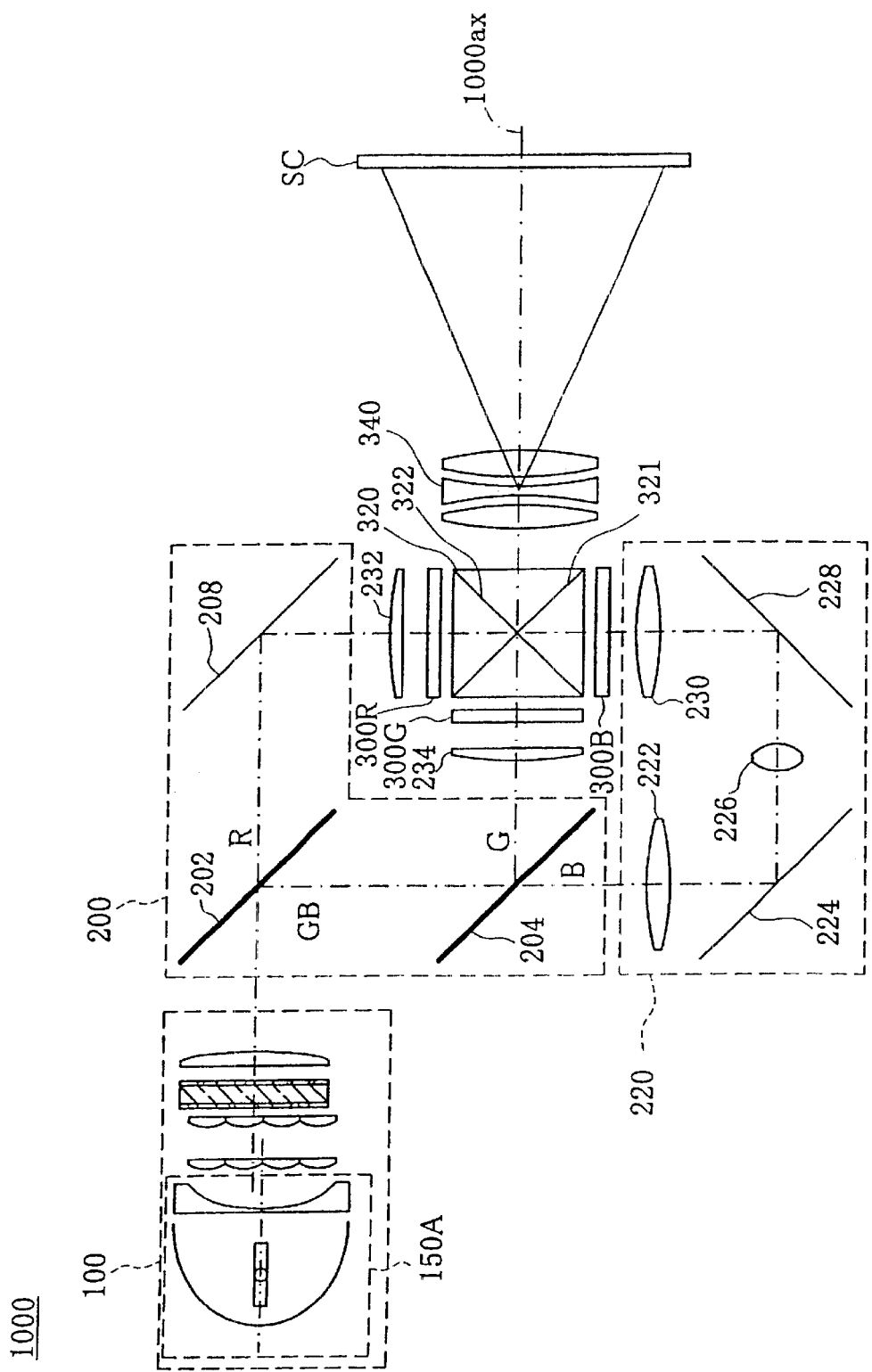
FIG. 14 is a schematic plan view showing the construction of a principal part of a projector 1000 using the illuminating optical system 100 in FIG. 11.

FIG. 14 is a schematic plan view showing the construction of a principal part of a projector using the illuminating optical system 100 in FIG. 11. A projector 1000 includes an illuminating optical system 100, a color light separation optical system 200, a relay optical system 220, three liquid crystal light valves 300R, 300G, and 300B, a crossed dichroic prism 320, and a projection optical system 340. Light emitted from the illuminating optical system 100 is separated by the color light separation optical system 200 into light of the three colors red (R), green (G), and blue (B). Separated color lights are modulated by the liquid crystal light valves 300R, 300G, and 300B according to image information. Modulated color lights are synthesized by the crossed dichroic prism 320, and an image is projected and displayed on a screen SC by the projection optical system 340.

The illuminating optical system 100, as described by FIG. 11, emits illumination light of the linear polarized light beam (s-polarized light beam) polarized in the same direction, and illuminates liquid crystal light valves 300R, 300G, and 300B that correspond to the illumination area LA in FIG. 11. Each of the liquid crystal light valves 300R, 300G, and 300B of this embodiment is composed of a liquid crystal panel corresponding to the electro-optical device of the present invention, and polarizers disposed on the side of a light incident surface and on the side of a light emission surface. The polarizers disposed on the side of the light incidence surfaces of the liquid crystal panels are intended for increasing the degree of polarization of the illumination light, and the polarizers are disposed so that the polarization direction of the linear polarized light beam emitted from the illuminating optical system 100 coincides with the direction of the polarization axes of the polarizers.

The color light separation optical system 200 includes two dichroic mirrors 202 and 204, and a reflecting mirror 208, and has the function of separating a light beam emitted from the illuminating optical system 100 into light of three colors red, green, and blue. The first dichroic mirror 202 transmits a red light component of the light emitted from the illuminating optical system 100, and reflects a blue light component and a green light component. The red light R transmitted by the first dichroic mirror 202 is reflected by the reflecting mirror 208, and is emitted toward the crossed dichroic prism 320. The red light R emitted from the color light separation optical system 200 passes through a field lens 232 to reach the liquid crystal light valve 300R for the red light. The field lens 232 converts each of the partial light beams emitted from the illuminating optical system 100 into a light beam parallel to the central axis thereof. This also applies to field lenses 234 and 230 provided in front of other liquid crystal light valves.

Of the blue light B and the green light G reflected by the first dichroic mirror 202, the green light G is reflected by the second dichroic mirror 204, and is emitted from the color light separation optical system 200 toward the crossed dichroic prism 320. The green light G emitted from the color light separation optical system 200 passes through the field lens 234 to reach the liquid crystal light valve 300G for the green light. On the other hand, the blue light B transmitted by the second dichroic mirror 204 is emitted from the color light separation optical system 200, and enters the relay optical system 220.

The blue light B incident on the relay optical system 220 passes through an incidence-side lens 222, a relay lens 226, reflecting mirrors 224 and 228, and an emission-side lens (field lens) 230 provided on the relay optical system 220 to reach the liquid crystal light valve 300B for the blue light. The relay optical system 220 is used for the blue light B because the length of the optical path of the blue light B is longer than the length of the optical paths of other color lights, and the use of the relay optical system 220 can transmit the blue light B incident on the incidence-side lens 222 unchanged to the emission-side lens 230.

The three liquid crystal light valves 300R, 300G, and 300B function as optical modulation means for modulating the light of three colors according to image information (image signals) to form an image. The crossed dichroic prism 320 functions as a color light-synthesizing optical system for synthesizing color lights of three colors modulated through the liquid crystal light valves 300R, 300G, and 300B to form a color image. The crossed dichroic prism 320 has red light-reflecting dichroic surfaces 321 and blue light-reflecting dichroic surfaces 322 formed in a nearly X-shape on the interfaces of four rectangular prism. The red light-reflecting dichroic surfaces 321 are formed with dielectric multilayer films for reflecting the red light. The blue light-reflecting dichroic surfaces 322 are formed with dielectric multilayer films for reflecting the blue light. The three color lights are synthesized by the red light-reflecting dichroic surface 321 and the blue light-reflecting dichroic surfaces 322, whereby synthesized light for projecting the color image is formed.

The synthesized light produced by the crossed dichroic prism 320 is emitted toward the projection optical system 340. The projection optical system 340 projects the synthesized light emitted from the crossed dichroic prism 320, and displays a color image on the screen SC. A telecentric lens may be used as the projection optical system 340.

In the projector 1000, the light source device 150A capable of emitting a light beam of high parallelism is used in the illuminating optical system 100. This can increase light utilization efficiency in the projector 1000, so that it is possible to display a brighter image. Even if the light source devices 150B to 150D are used instead of the light source device 150A, similar advantages can be obtained.

While the illuminating optical system 100 includes the uniform illuminating optical system formed by the lens arrays 40, 50 and the superimposing lens 70, and the polarized-light generating optical system 60 in the projector 1000 of this embodiment, the light source devices 150A to 150D may be used separately without the combination with the uniform illuminating optical system or the polarized-light generating optical system. In addition, the light source devices 150A to 150D can constitute the illuminating optical system by the combination only with the uniform illuminating optical system. That is, an illuminating optical system that is not provided with the polarized-light generating optical system 60 can be applied to the projector 1000 of this embodiment.

This invention is not limited to the above embodiments and modes for carrying out the invention, and can be carried out in various forms without departing from the spirit and scope of the invention. For example, the following modifications can be made.

Figure 15:
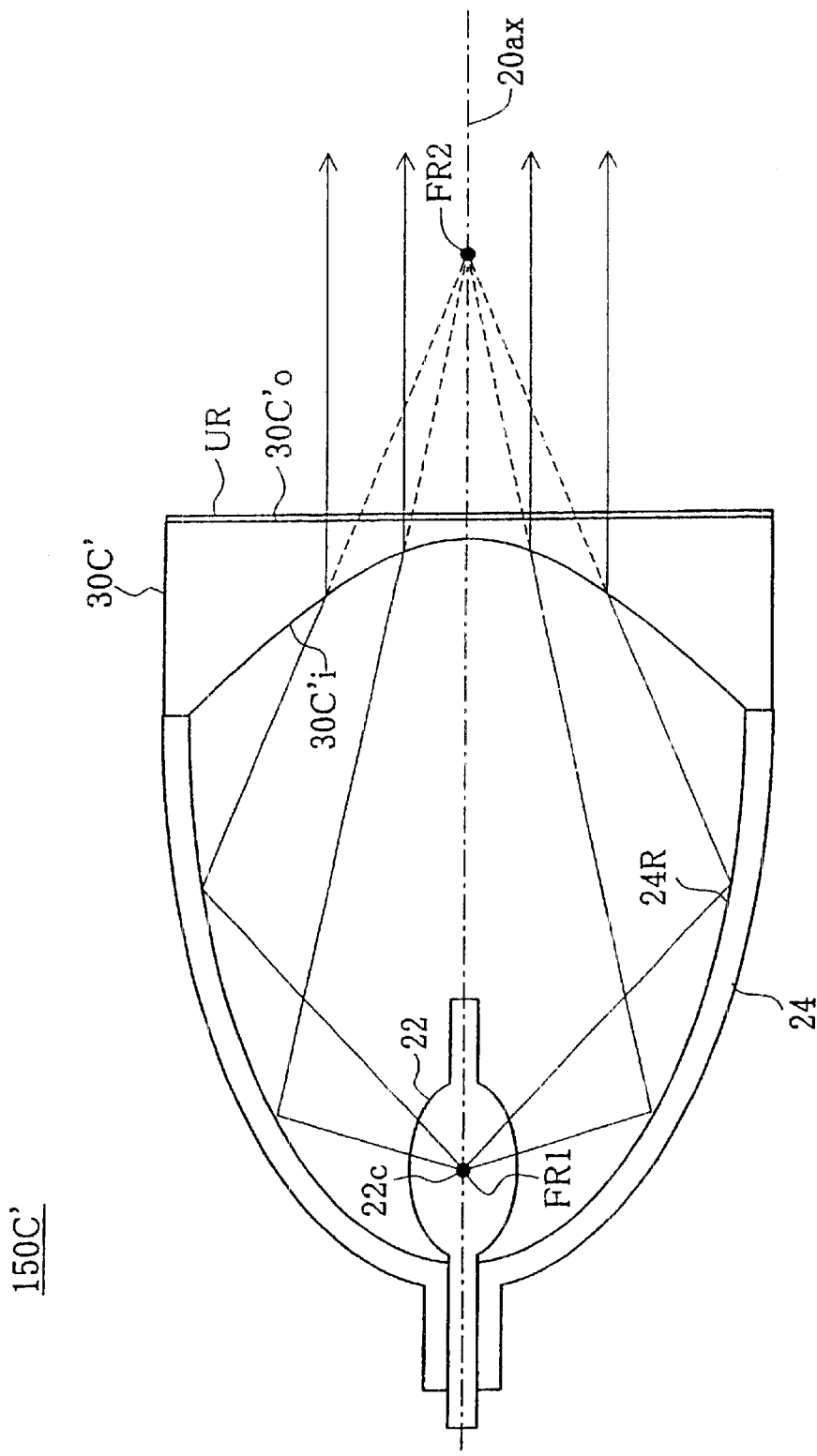
FIG. 15 is an illustration showing a light source device 150C' in which an aspherical lens is bonded to an opening surface of an elliptical reflector.

(1) While the aspherical lenses 30A to 30D are disposed at positions apart from the opening surface of the elliptical reflector 24 in the above-described light source devices 150A to 150D, they may be bonded to the opening surface. FIG. 15 is an illustration showing a light source device 150C' in which an aspherical lens is bonded to an opening surface of an elliptical reflector. The light source device 150C' includes a discharge lamp 22, an elliptical reflector 24, and an aspherical lens 30C'. The light source device 150C' is obtained by adjusting the shape of the aspheric surface of the aspherical lens 30C of the light source device 150C (FIGS. 7 and 8) according to the third embodiment, modifying the periphery, and bonding the aspherical lens 30C to the opening surface of the elliptical reflector. By disposing the aspherical lens 30C' while bonding to the opening surface of the elliptical reflector 24 in this way, the light source device 150C' can be reduced in size, and it is possible to allow the aspherical lens 30C' to function as a front glass of the light source device 150C'.

Similarly, regarding the light source devices 150A and 150B of the first and second embodiments, the aspherical lenses 30A and 30B may be bonded to the opening surface of the elliptical reflector 24. In the light source device 150D according to the fourth embodiment, however, when the aspherical lens 30D is bonded to the opening surface of the elliptical reflector 24, the light source device increases in size. That is, in general, when the aspheric surface of the aspherical lens is a concave surface, the aspherical lens can be bonded to the opening surface of the elliptical reflector 24.

(2) In addition, in the light source device 150C' shown in FIG. 15, an emission surface 30C' of the aspherical lens 30C' is formed with an ultraviolet reflecting film UR. In this case, since ultraviolet light emitted from the discharge lamp 22 is reflected by the ultraviolet reflecting film UR to return to the inside of the elliptical reflector 24, the ultraviolet light can be prevented from being emitted from the light source device 150C'. As a result, for example, when the light source device 150C' is applied to the projector 1000, the liquid crystal light valves can be prevented from being deteriorated by ultraviolet rays. In addition, in the light source device 150C', the ultraviolet light emitted from the discharge lamp 22 vertically enters the ultraviolet reflecting film UR formed on the emission surface 30C' of the aspherical lens 30C'. In this case, the ultraviolet light that is reflected by the ultraviolet reflecting film UR enters the discharge lamp 22 following the same route. When the ultraviolet light enters the center 22c of the discharge lamp 22, the discharge lamp 22 emits light having a wavelength longer than that of the incident ultraviolet light. This makes it possible to increase intensity of visible light emitted from the light source device 150C'.

While the aspherical lens 30C' that is bonded to the opening surface of the elliptical reflector 24 is formed with the ultraviolet reflecting film UR in FIG. 15, this will be similarly applicable to a case where the aspherical lens 30C is provided at a position apart form the opening surface of the elliptical reflector 24, as shown in FIGS. 7 and 8.

Similarly, even in the light source devices 150B and 150D according to the second and fourth embodiments, the aspherical lenses 30B and 30D may be formed with an ultraviolet reflecting film. In the light source device 150B, the incidence surface 30Bi of the aspherical lens 30B may be formed with the ultraviolet reflecting film. In addition, in the light source device 150D, the emission surface 30Do of the aspherical lens 30D may be formed with the ultraviolet reflecting film. In this case, since the ultraviolet light reflected by the ultraviolet reflecting film enters the discharge lamp 22 following the same route in a manner similar to the light source device 150C' shown in FIG. 15, it is possible to increase intensity of visible light. In general, of the incidence surface and the emission surface of the aspherical lens, the surface into which the ultraviolet light emitted from the discharge lamp enters substantially from the direction of the normal line may be formed with the ultraviolet reflecting film.

(3) While the first lens array 40 is separately provided in the above illuminating optical system 100 (FIG. 11), the first lens array may be provided on the emission surface of the aspherical lens. That is, when the light source devices 150C and 150D according to the third and the fourth embodiment are used as the light source device of the illuminating optical system 100, since the emission surfaces 30Co and 30Do of the aspherical lenses 30C and 30D are plane surfaces, it is possible to provide the first lens array on the emission surface of the aspherical lens. In this case, as each of the small lenses 42 of the first lens array 40 shown in FIG. 11, a plano-convex lens having a plane surface on the side of the aspherical lens may be used.

This is also applicable to a case where the aspherical lens is bonded to the opening surface of the elliptical reflector like the light source device 150C' shown in FIG. 15. If the lens array is provided on the emission surface of the aspherical lens in this way, it is possible to reduce the illuminating optical system in size. The lens array may be directly formed on the emission surface of the aspherical lens, or may be bonded to the emission surface. When the lens array is directly formed on the emission surface of the aspherical lens, the number of components can be decreased.

(4) While an example has been described in the above embodiments in a case where the present invention is applied to a transmissive type projector, it is possible to apply the present invention to a reflective type projector. Here, "transmissive" means that an electro-optical device serving as an optical modulation means, such as a transmissive type liquid crystal panel, is of a type for transmitting light, and "reflective" means that an electro-optical device serving as an optical modulation means, such as a reflective type liquid crystal panel, is of a type for reflecting light. In a reflective type projector, a crossed dichroic prism is utilized as a color light separation means for separating light into light of three colors red, green, and blue, and is also utilized as a color light-synthesizing means for synthesizing modulated light of three colors again to emit the light in the same direction. When this invention is applied to the reflective type projector, advantages that are substantially similar to those of the transmissive type projector can be obtained.

(5) While the projector 1000 for displaying a color image is described in the above embodiments, it is also possible to apply the illuminating optical system of the present invention to a projector for displaying a monochrome image. In this case, advantages similar to the above projectors can be obtained.

(6) While the projector 1000 uses the liquid crystal panels as the electro-optical devices in the above embodiments, the electro-optical devices are not limited thereto. In general, as an electro-optical device, one for modulating an incident light according to image information may be used, and a micro-mirror-type optical modulation device or the like may be used. As the micro-mirror-type optical modulation device, for example, the DMD (Digital Micro-mirror Device) (registered trademark of TI Inc.) can be used.

What is claimed is:

1. A light source device, comprising:
a discharge lamp;
an elliptical reflector including a reflecting surface for reflecting light emitted from the discharge lamp; and
a lens having an incidence surface and an emission surface for collimating the light reflected by the reflecting surface, the lens being an aspherical lens with an aspheric surface in the shape of a quadric surface of revolution on the emission surface, and a planar surface on the incidence surface.

2. The light source device as claimed in claim 1, the aspheric surface having the shape represented by the following expression when taking coordinate values in the rθZ cylindrical coordinate system, in which the origin is the point of intersection of the aspheric surface and a light source optical axis and which is axisymmetric with respect to the optical axis, as r and Z, the paraxial curvature as c, and the conic constant as K:

$$Z - \frac{c \cdot r^2}{1 + \sqrt{1 - (1+K) \cdot c^2 \cdot r^2}} = 0.$$

3. The light source device as claimed in claim 1, the aspheric surface being a concave surface.

4. The light source device as claimed in claim 1, the aspherical lens being bonded to an opening surface of the elliptical reflector.

5. The light source device as claimed in claim 3, the aspheric surface having the shape of an ellipsoid of revolution.

6. The light source device as claimed in claim 5, the aspheric surface having the shape represented by the following expression when taking coordinate values in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, and the conic constant as K:

$$Z - \frac{c \cdot r^2}{1 + \sqrt{1 - (1+K) \cdot c^2 \cdot r^2}} = 0, \text{ and}$$

the elliptical reflector having the shape represented by the following expression when taking coordinate values in the rθZ cylindrical coordinate system, in which the origin is the point of intersection of the reflecting surface and the light source optical axis, the light source optical axis is the Z-axis, and the axis perpendicularly intersecting the light source optical axis is the r-axis, as rR and ZR, the paraxial curvature as cR, and the conic constant as KR:

$$Z_R - \frac{c_R \cdot r_R^2}{1 + \sqrt{1 - (1+K_R) \cdot c_R^2 \cdot r_R^2}} = 0,$$

and $K_R$ is within the range of $-0.8 < K_R < -0.5$.

7. The light source device as claimed in claim 1, the emission surface of the aspherical lens being formed with an ultraviolet reflecting film.

8. The light source device as claimed in claim 1, the aspheric surface being a convex surface.

9. The light source device as claimed in claim 8, the aspheric surface having the shape of an ellipsoid of revolution.

10. An illuminating optical system, comprising:
the light source device as claimed in claim 1;
a lens array for dividing light emitted from the light source device into a plurality of partial light beams; and
a superimposing lens for superimposing the partial light beams divided by the lens array on an illumination area.

11. A projector, comprising:
the light source device as claimed in claim 1;
an electro-optical device having a light incidence surface as an illumination area illuminated by the light source device, and modulating the incident light from the light source device according to image information; and
a projection optical system for projecting light modulated by the electro-optical device.

12. The light source device as claimed in claim 9, the aspheric surface having the shape represented by the following expression when taking coordinate values in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, and the conic constant as K:

$$Z - \frac{c \cdot r^2}{1 + \sqrt{1 - (1+K) \cdot c^2 \cdot r^2}} = 0, \text{ and}$$

the elliptical reflector having the shape represented by the following expression when taking coordinate values in the rθZ cylindrical coordinate system, in which the origin is the point of intersection of the reflecting surface and the light source optical axis, the light source optical axis is the Z-axis, and the axis perpendicularly intersecting the light source optical axis is the r-axis, as rR and ZR, the paraxial curvature as cR, and the conic constant as KR:

$$Z_R - \frac{c_R \cdot r_R^2}{1 + \sqrt{1 - (1+K_R) \cdot c_R^2 \cdot r_R^2}} = 0,$$

and $K_R$ is within the range of $-0.8 < K_R < -0.5$.

13. A light source device comprising:
a discharge lamp;
an elliptical reflector including a reflecting surface for reflecting light emitted from the discharge lamp; and
a lens having an incidence surface and an emission surface for collimating the light reflected by the reflecting surface, the lens being an aspherical lens with an aspheric surface in the shape of a quadric surface of revolution on the emission surface, and the incidence surface being a spherical surface, wherein the incidence surface of the aspherical lens being formed with an ultraviolet reflecting film.

14. The illuminating optical system as claimed in claim 13, the aspheric surface having the shape represented by the following expression when taking coordinate values in the rθZ cylindrical coordinate system, in which the origin is the point of intersection of the aspheric surface and a light source optical axis and which is axisymmetric with respect to the optical axis, as r and Z, the paraxial curvature as c, and the conic constant as K:

$$Z - \frac{c \cdot r^2}{1 + \sqrt{1 - (1+K) \cdot c^2 \cdot r^2}} = 0.$$

15. The light source device as claimed in claim 13, the aspherical lens being bonded to an opening surface of the elliptical reflector.

16. The light source device as claimed in claim 13, the aspheric surface being a concave surface.

17. The light source device as claimed in claim 16, the aspheric surface having the shape of an ellipsoid of revolution.

18. The light source device as claimed in claim 17, the aspheric surface having the shape represented by the following expression when taking coordinate values in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, the conic constant as K, and the refraction index of the lens as n:

$$Z - \frac{c \cdot r^2}{1 + \sqrt{1 - (1+K) \cdot c^2 \cdot r^2}} = 0, \quad K = -\frac{1}{n^2}.$$

19. The light source device as claimed in claim 13, the aspheric surface being a convex surface.

20. The light source device as claimed in claim 19, the aspheric surface having the shape of an ellipsoid of revolution.

21. The light source device as claimed in claim 20, the aspheric surface having the shape represented by the following expression when taking coordinate values in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, the conic constant as K, and the refraction index of he lens as n:

$$Z - \frac{c \cdot r^2}{1 + \sqrt{1 - (1+K) \cdot c^2 \cdot r^2}} = 0, \quad K = -\frac{1}{n^2}.$$

22. A projector, comprising:
the light source device as claimed in claim 13;
an electro-optical device having a light incidence surface as an illumination area illuminated by the light source device, and modulating the incident light from the light source device according to image information; and
a projection optical system for projecting light modulated by the electro-optical device.

23. An illuminating optical system, comprising:
the light source device as claimed in claim 13;
a lens array for dividing light emitted from the light source device into a plurality of partial light beams; and
a superimposing lens for superimposing the partial light beams divided by the lens array on an illumination area.

24. A light source device, comprising:
a discharge lamp;
an elliptical reflector including a reflecting surface for reflecting light emitted from the discharge lamp; and
a lens having an incidence surface and an emission surface for collimating the light reflected by the reflecting surface, the lens being an aspherical lens with an aspheric surface in the shape of a quadric surface of revolution on the incidence surface, and a planar surface on the emission surface.

25. The light source device as claimed in claim 24, the incidence surface of the aspherical lens being formed with an ultraviolet reflecting film.

26. An illuminating optical system, comprising:
the light source device as claimed in claim 24;
a lens array for dividing light emitted from the light source device into a plurality of partial light beams; and
a superimposing lens for superimposing the partial light beams divided by the lens array on an illumination area, and
the lens array is provided on the emission surface of the aspherical lens.

27. The projector as claimed in claim 24, the aspheric surface having the shape represented by the following expression when taking coordinate values in the rθZ cylindrical coordinate system, in which the origin is the point of intersection of the aspheric surface and a light source optical axis and which is axisymmetric with respect to the optical axis, as r and Z, the paraxial curvature as c, and the conic constant as K:

$$Z - \frac{c \cdot r^2}{1 + \sqrt{1 - (1+K) \cdot c^2 \cdot r^2}} = 0.$$

28. The light source device as claimed in claim 24, the aspherical lens being bonded to an opening surface of the elliptical reflector.

29. The light source device as claimed in claim 24, the aspheric surface being a concave surface.

30. The light source device as claimed in claim 29, the aspheric surface having the shape of a hyperboloid of revolution.

31. The light source device as claimed in claim 30, the aspheric surface having the shape represented by the following expression when taking coordinate values in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, the conic constant as K, and the refraction index of the lens as n:

$$Z - \frac{c \cdot r^2}{1 + \sqrt{1 - (1+K) \cdot c^2 \cdot r^2}} = 0, \quad K = -n^2.$$

32. The light source device as claimed in claim 24, the aspheric surface being a convex surface.

33. The light source device as claimed in claim 32, the aspheric surface having the shape of a hyperboloid of revolution.

34. The light source device as claimed in claim 33, the aspheric surface having the shape represented by the following expression when taking coordinate values in the rθZ cylindrical coordinate system, in which the origin is the point of intersection of the aspheric surface and a light source optical axis, the light source optical axis is the Z-axis, and the axis perpendicularly intersecting the light source optical axis is the r-axis, as r and Z, the paraxial curvature as c, the conic constant as K, and the refraction index of the lens as n:

$$Z - \frac{c \cdot r^2}{1 + \sqrt{1 - (1+K) \cdot c^2 \cdot r^2}} = 0, \quad K = -n^2.$$

35. A projector, comprising:
the light source device as claimed in claim 24;
an electro-optical device having a light incidence surface as an illumination area illuminated by the light source device, and modulating the incident light from the light source device according to image information; and
a projection optical system for projecting light modulated by the electro-optical device.

* * * * *